(12) United States Patent
Miyakoshi et al.

(10) Patent No.: US 11,097,599 B2
(45) Date of Patent: Aug. 24, 2021

(54) VEHICLE AIR CONDITIONING DEVICE

(71) Applicant: SANDEN AUTOMOTIVE CLIMATE SYSTEMS CORPORATION, Isesaki (JP)

(72) Inventors: Ryo Miyakoshi, Isesaki (JP); Kenichi Suzuki, Isesaki (JP); Kohei Yamashita, Isesaki (JP)

(73) Assignees: HONDA MOTOR CO., LTD., Tokyo (JP); SANDEN AUTOMOTIVE CLIMATE SYSTEMS CORPORATION, Gunma (JP)

( * ) Notice: Subject to any disclaimer, the term of this patent is extended or adjusted under 35 U.S.C. 154(b) by 435 days.

(21) Appl. No.: 16/077,209

(22) PCT Filed: Feb. 21, 2017

(86) PCT No.: PCT/JP2017/008035
§ 371 (c)(1),
(2) Date: Aug. 10, 2018

(87) PCT Pub. No.: WO2017/150593
PCT Pub. Date: Sep. 8, 2017

(65) Prior Publication Data
US 2021/0016629 A1  Jan. 21, 2021

(30) Foreign Application Priority Data
Feb. 29, 2016 (JP) .............................. JP2016-037045

(51) Int. Cl.
*B60H 1/22* (2006.01)
*B60H 1/32* (2006.01)
(Continued)

(52) U.S. Cl.
CPC ............. *B60H 1/2218* (2013.01); *B60H 1/32* (2013.01); *B60H 1/00392* (2013.01);
(Continued)

(58) Field of Classification Search
CPC .......... B60H 1/22; B60H 1/32; B60H 1/2218; B60H 1/00392; B60H 1/143;
(Continued)

(56) References Cited

U.S. PATENT DOCUMENTS

2016/0185185 A1\* 6/2016 Suzuki .................... B60L 1/02
237/5

FOREIGN PATENT DOCUMENTS

| CN | 102788397 | 11/2012 |
|----|-----------|---------|
| JP | 5-178069  | 7/1993  |

(Continued)

OTHER PUBLICATIONS

Notification of Reasons for Refusal dated Jan. 7, 2020 issued in Japanese Patent Application No. 2016-037045.
(Continued)

*Primary Examiner* — Joseph F Trpisovsky
(74) *Attorney, Agent, or Firm* — Cozen O'Connor

(57) ABSTRACT

There is provided a vehicle air conditioning device of a heat pump system which improves comfortability when changing to heating only by an auxiliary heating device. The device includes a heating medium circulating circuit 23 to heat air to be supplied from an air flow passage 3 to a vehicle interior, and when shifting to the heating of the vehicle interior only by the heating medium circulating circuit 23 in a heating mode, a controller executes a shifting control to increase a heating capability of the heating medium circulating circuit 23 prior to stopping a compressor 2 and decrease a heating capability of a radiator 4 in accordance with the increase of the heating capability of the heating medium circulating circuit 23.

8 Claims, 10 Drawing Sheets

(51) Int. Cl.
    *B60H 1/00*        (2006.01)
    *B60H 1/14*        (2006.01)
(52) U.S. Cl.
    CPC ........ *B60H 1/143* (2013.01); *B60H 2001/224* (2013.01); *B60H 2001/2228* (2013.01); *B60H 2001/2265* (2013.01); *B60H 2001/3272* (2013.01)
(58) Field of Classification Search
    CPC ...... B60H 2001/2228; B60H 2001/224; B60H 2001/3272; B60H 2001/00128; B60H 2001/2265
    See application file for complete search history.

(56) References Cited

FOREIGN PATENT DOCUMENTS

| | | |
|---|---|---|
| JP | 6-344764 | 12/1994 |
| JP | 10-226222 | 8/1998 |
| JP | 2014-213765 | 11/2014 |
| JP | 2016-185757 | 10/2016 |

OTHER PUBLICATIONS

Office Action dated Nov. 18, 2020 issued Chinese Patent Application No. 201780012276.3.

* cited by examiner

VEHICLE AIR CONDITIONING DEVICE

RELATED APPLICATIONS

This is a U.S. National Phase Application under 35 USC 371 of International Application PCT/JP2017/008035 filed on Feb. 21, 2017.

This application claims the priority of Japanese application no. 2016-037045 filed Feb. 29, 2016, the entire content of which is hereby incorporated by reference.

TECHNICAL FIELD

The present invention relates to an air conditioning device of a heat pump system which conditions air of a vehicle interior, and more particularly, it relates to a vehicle air conditioning device which is suitable for a hybrid car and an electric vehicle.

BACKGROUND ART

To cope with enhancement of environmental problems in recent years, hybrid cars and electric vehicles have spread. As an air conditioning device which can be applied to such vehicles, there has been developed a device including a compressor to which power is supplied from a battery of a vehicle, so that a refrigerant is compressed and discharged, a radiator disposed in an air flow passage through which air to be supplied to a vehicle interior flows to let a refrigerant radiate heat, a heat absorber disposed in the air flow passage to let the refrigerant absorb heat, and an outdoor heat exchanger disposed outside the vehicle interior to let the refrigerant radiate heat or absorb heat, and there are switched and executed respective modes of a heating mode to let the refrigerant discharged from a compressor radiate heat in the radiator and let the refrigerant from which the heat has been radiated in this radiator absorb heat in the outdoor heat exchanger, a dehumidifying and heating or dehumidifying and cooling mode to let the refrigerant discharged from the compressor radiate heat in the radiator and let the refrigerant from which the heat has been radiated in the radiator absorb heat in the heat absorber, and a cooling mode to let the refrigerant discharged from the compressor radiate heat in the outdoor heat exchanger and let the refrigerant absorb heat in the heat absorber (e.g., see Patent Document 1).

Furthermore, in Patent Document 1, it has been suggested that a heating medium-air heat exchanger of an auxiliary heating device is disposed in an air flow passage, and when a heating capability of a radiator runs short to a required capability in a heating mode, a heating medium heated with an electric heater to which power is supplied from a battery circulates through the heating medium-air heat exchanger to heat the air to be supplied to the vehicle interior, thereby complementing the shortage.

CITATION LIST

Patent Documents

Patent Document 1: Japanese Patent Application Publication No. 2014-213765

SUMMARY OF THE INVENTION

Problems to be Solved by the Invention

Here, for example, when a heating capability of a radiator deteriorates due to frosting to an outdoor heat exchanger, it is necessary to stop a compressor and change to a heating operation only by an auxiliary heating device. In this case, for example, when the heating by the auxiliary heating device starts simultaneously with the stopping of the compressor, a temperature of air to be blown out to a vehicle interior fluctuates to be lower.

FIG. 10 of the present application shows a the behavior of fluctuation of an outlet temperature which occurs in such a device as shown in FIG. 10 of Patent Document 1 mentioned above. In the drawing, TGQ is a required heating capability of a radiator, Qhp is an HP actual capability that is the heating capability actually generated by the radiator, and Qhtr is an HTR actual capability that is a heating capability actually generated by the auxiliary heating device. Furthermore, TCO is a target radiator temperature that is a target value of the temperature of the radiator which is calculated from a target outlet temperature that is a target value of the temperature of the air blown out to the vehicle interior, TCI is a temperature of the radiator (a temperature of air passed through the radiator), Thtr is a temperature of the auxiliary heating device (an auxiliary heater temperature), and NC is a number of revolution of the compressor.

Additionally, in FIG. 10, an illustrated range of an HP operation shows a state where the compressor is operated to heat the vehicle interior with the radiator (the auxiliary heating device is stopped), and an illustrated range of an operation only by the auxiliary heater shows a state where the vehicle interior is heated only by the auxiliary heating device. In the illustrated range of the HP operation, Qhp is adjusted to the required capability TGQ, and in the illustrated range of the operation only by the auxiliary heater, Qhtr is adjusted to the required capability TGQ.

When the compressor is stopped from the HP operation state of FIG. 10 due to, for example, the frosting to the outdoor heat exchanger (NC=0) and simultaneously the heating by the auxiliary heating device starts, the HP actual capability denoted with Qhp in the drawing rapidly reduces, but the temperature Thtr of the auxiliary heating device does not immediately rise, and the HTR actual capability denoted with Qhtr does not also immediately increases. Consequently, the radiator temperature TCI that is a temperature of air flowing through the radiator toward the vehicle interior noticeably drops, and as a result, discomfort is given to passengers.

The present invention has been developed to solve such conventional technical problems, and an object thereof is to improve comfortability when changing to heating only by an auxiliary heating device in a vehicle air conditioning device of a so-called heat pump system.

Means for Solving the Problems

A vehicle air conditioning device of the present invention includes a compressor to compress a refrigerant, an air flow passage through which air to be supplied to a vehicle interior flows, a radiator to let the refrigerant radiate heat, thereby heating the air to be supplied from the air flow passage to the vehicle interior, an outdoor heat exchanger disposed outside the vehicle interior to let the refrigerant absorb heat, and a control device, so that this control device executes a heating mode to let the refrigerant discharged from the compressor radiate heat in the radiator, decompress the refrigerant from which the heat has been radiated, and let the refrigerant absorb heat in the outdoor heat exchanger, thereby heating the vehicle interior, the vehicle air conditioning device includes an auxiliary heating device to heat the air to be supplied from the air flow passage to the vehicle interior, and the vehicle air conditioning device is characterized in that when shifting to the heating of the vehicle interior only by the auxiliary heating device in the heating mode, the control device executes a shifting control to increase a heating capability of the auxiliary heating device prior to stopping the compressor and decrease a heating capability of the radiator in accordance with the increase of the heating capability of the auxiliary heating device.

The vehicle air conditioning device of the invention of claim 2 is characterized in that in the above invention, in the heating mode, the control device calculates a required capability TGQ that is a required heating capability of the radiator, and in the shifting control, the control device adjusts a required capability TGQhtr of the auxiliary heating device to the required capability TGQ.

The vehicle air conditioning device of the invention of claim 3 is characterized in that in the above invention, the control device gradually increases the required capability TGQhtr of the auxiliary heating device up to the required capability TGQ.

The vehicle air conditioning device of the invention of claim 4 is characterized in that in the invention of claim 2 or claim 3, in the heating mode, the control device calculates a target value of a high pressure on the basis of a target outlet temperature that is a target value of a temperature of air to be blown out to the vehicle interior, and controls a number of revolution of the compressor on the basis of the target value, the high pressure and the required capability TGQ, and in the shifting control, the control device subtracts, from the required capability TGQ, an HTR actual capability Qhtr that is a heating capability actually generated by the auxiliary heating device.

The vehicle air conditioning device of the invention of claim 5 is characterized in that in the above invention, in the heating mode, the control device calculates a F/F control amount TGNChff of a target number of revolution of the compressor by feedforward calculation based on at least a required capability TGQ, calculates a F/B control amount TGNChfb of the target number of revolution of the compressor by feedback calculation based on the target value and the high pressure, and adds the F/F control amount TGNChff and the F/B control amount TGNChfb to calculate a target number of revolution TGNCh of the compressor, and in the shifting control, the control device calculates the F/F control amount TGNChff on the basis of a value (TGQ−Qhtr) obtained by subtracting the HTR actual capability Qhtr from the required capability TGQ.

The vehicle air conditioning device of the invention of claim 6 is characterized in that in the above respective inventions, in the shifting control, the control device starts increase of the heating capability of the auxiliary heating device prior to starting decrease of the heating capability of the radiator in accordance with a heat capacity of the auxiliary heating device.

The vehicle air conditioning device of the invention of claim 7 is characterized in that in the above respective inventions, the control device starts the shifting control when there is established one of a condition that frosting to the outdoor heat exchanger proceeds, a condition that an operation efficiency of the compressor decreases, and a condition that heat absorption by the radiator occurs.

The vehicle air conditioning device of the invention of claim 8 is characterized in that in the above invention, in the shifting control, the control device stops the compressor when there is established one of a condition that a difference (TGQ−Qhtr) between the required capability TGQ that is the required heating capability of the radiator and the HTR actual capability Qhtr that is the heating capability actually generated by the auxiliary heating device decreases to be not more than a predetermined value, a condition that an HP actual capability Qhp that is a heating capability actually generated by the radiator decreases to be not more than a predetermined value, and a condition that the target number of revolution TGNCh of the compressor decreases to be not more than a predetermined value.

The vehicle air conditioning device of the invention of claim 9 is characterized in that in the invention of claim 7 or claim 8, in the heating mode, when any one of the conditions to start the shifting control is not established, the control device executes cooperative control to complement shortage of the heating capability of the radiator with the heating by the auxiliary heating device.

Advantageous Effect of the Invention

According to the present invention, a vehicle air conditioning device includes a compressor to compress a refrigerant, an air flow passage through which air to be supplied to a vehicle interior flows, a radiator to let the refrigerant radiate heat, thereby heating the air to be supplied from the air flow passage to the vehicle interior, an outdoor heat exchanger disposed outside the vehicle interior to let the refrigerant absorb heat, and a control device, so that this control device executes a heating mode to let the refrigerant discharged from the compressor radiate heat in the radiator, decompress the refrigerant from which the heat has been radiated, and let the refrigerant absorb heat in the outdoor heat exchanger, thereby heating the vehicle interior. The vehicle air conditioning device includes an auxiliary heating device to heat the air to be supplied from the air flow passage to the vehicle interior, and when shifting to the heating of the vehicle interior only by the auxiliary heating device in the heating mode, the control device executes a shifting control to increase a heating capability of the auxiliary heating device prior to stopping the compressor and decrease a heating capability of the radiator in accordance with the increase of the heating capability of the auxiliary heating device. Consequently, when shifting to the heating only by the auxiliary heating device, it is possible to prevent or inhibit the disadvantage that the heating capability of the radiator rapidly decreases and a temperature of air to be blown out to the vehicle interior fluctuates to noticeably lower, before the heating capability of the auxiliary heating device increases, and it is possible to improve comfortability of passengers.

In this case, as in the invention of claim 2, in the shifting control, the control device adjusts a required capability TGQhtr of the auxiliary heating device to a required capability TGQ that is a required heating capability of the radiator in the heating mode. Consequently, it is possible to rapidly increase the heating capability of the auxiliary heating device.

In particular, as in the invention of claim 3, the control device gradually increases the required capability TGQhtr of the auxiliary heating device up to the required capability TGQ. Consequently, it is possible to inhibit the rapid increase of the heating capability of the auxiliary heating device, thereby further effectively inhibiting rapid fluctuation of the temperature of the air to be blown out to the vehicle interior.

Specifically, as in the invention of claim 4, in the heating mode, the control device calculates a target value of a high pressure on the basis of a target outlet temperature that is a target value of the temperature of the air to be blown out to the vehicle interior, and controls a number of revolution of the compressor on the basis of the target value, the high pressure and the required capability TGQ, and in the shifting control, the control device subtracts, from the required capability TGQ, an HTR actual capability Qhtr that is a heating capability actually generated by the auxiliary heating device. Consequently, it is possible to achieve the decrease of the heating capability by the radiator in accordance with the increase of the heating capability by the auxiliary heating device.

In this case, as in the invention of claim 5, in the heating mode, the control device calculates a F/F control amount TGNChff of a target number of revolution of the compressor by feedforward calculation based on at least the required capability TGQ, calculates a F/B control amount TGNChfb of the target number of revolution of the compressor by feedback calculation based on the target value and the high pressure, and adds the F/F control amount TGNChff and the F/B control amount TGNChfb to calculate a target number of revolution TGNCh of the compressor, and in the shifting control, the control device calculates the F/F control amount TGNChff on the basis of a value (TGQ−Qhtr) obtained by subtracting the HTR actual capability Qhtr from the required capability TGQ. Consequently, it is possible to sensitively respond to the increase of the heating capability of the auxiliary heating device, rapidly decrease the number of revolution of the compressor, and achieve more accurate and comfortable shifting control.

Furthermore, as in the invention of claim 6, in the shifting control, the control device starts increase of the heating capability of the auxiliary heating device prior to starting decrease of the heating capability of the radiator in accordance with a heat capacity of the auxiliary heating device. Consequently, it is possible to cope with response delay of the auxiliary heating device having a large heat capacity without any hindrance.

Additionally, as in the invention of claim 7, the control device starts the shifting control when there is established one of a condition that frosting to the outdoor heat exchanger proceeds, a condition that an operation efficiency of the compressor deteriorates, and a condition that heat absorption by the radiator occurs. As in the invention of claim 9, when any one of the conditions to start the shifting control is not established, the control device executes cooperative control to complement shortage of the heating capability of the radiator with the heating by the auxiliary heating device. Consequently, it is possible to accurately achieve switching between cooperative heating by the radiator and the auxiliary heating device and the heating only by the auxiliary heating device.

In this case, as in the invention of claim 8, in the shifting control, the control device stops the compressor when there is established one of a condition that a difference (TGQ−Qhtr) between the required capability TGQ that is the required heating capability of the radiator and the HTR actual capability Qhtr that is the heating capability actually generated by the auxiliary heating device decreases to be not more than a predetermined value, a condition that an HP actual capability Qhp that is a heating capability actually generated by the radiator decreases to be not more than a predetermined value, and a condition that the target number of revolution TGNCh of the compressor decreases to be not more than a predetermined value. Consequently, it is possible to accurately shift to the heating only by the auxiliary heating device.

MODE FOR CARRYING OUT THE INVENTION

Hereinafter, description will be made as to an embodiment of the present invention in detail with reference to the drawings.

Figure 1:
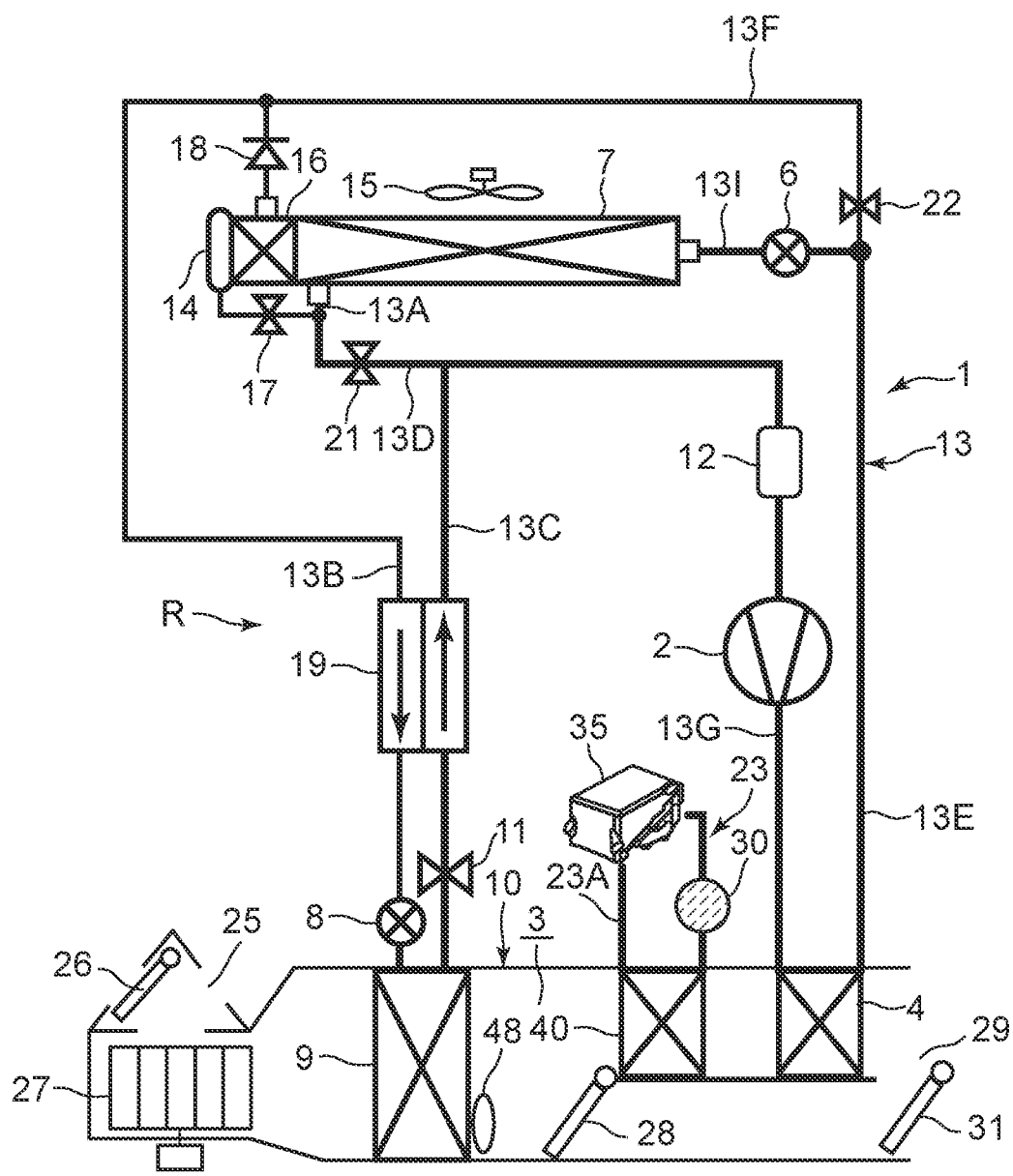
FIG. 1 is a constitutional view of a vehicle air conditioning device of an embodiment to which the present invention is applied.

FIG. 1 shows a constitutional view of a vehicle air conditioning device 1 as an embodiment of the present invention. In this case, a vehicle of the embodiment to which the present invention is applied is an electric vehicle (EV) which does not have an engine (an internal combustion engine), and runs with an electric motor for running which is driven by power charged in a battery (which is not shown in the drawing), and the vehicle air conditioning device 1 of the present invention is also driven by the power of the battery.

Specifically, in the electric vehicle which is not capable of performing heating by engine waste heat, the vehicle air conditioning device 1 of the embodiment performs heating by a heat pump operation in which a refrigerant circuit is used, and furthermore, the conditioning device selectively executes respective operation modes of dehumidifying and heating, dehumidifying and cooling, cooling and others. It is to be noted that the vehicle is not limited to the electric vehicle, and the present invention is also effective for a so-called hybrid car in which the engine is used together with the electric motor for running. Furthermore, the present invention is also applicable to a normal car which runs with the engine.

The vehicle air conditioning device 1 of the embodiment performs air conditioning (heating, cooling, dehumidifying, and ventilation) of a vehicle interior of the electric vehicle, and there are successively connected, by a refrigerant pipe 13, an electric type of compressor 2 to compress a refrigerant with power supplied from a battery of an unshown vehicle, thereby raising pressure, a radiator 4 (an indoor heat exchanger) disposed in an air flow passage 3 of an HVAC unit 10 in which vehicle interior air passes and circulates, to let the high-temperature high-pressure refrigerant discharged from the compressor 2 radiate heat in the vehicle, an outdoor expansion valve 6 (ECCV) constituted of an electronic expansion valve which decompresses and expands the refrigerant during the heating, an outdoor heat exchanger 7 which performs heat exchange between the refrigerant and outdoor air to function as the radiator during the cooling and to function as an evaporator during the heating, an indoor expansion valve 8 constituted of an electronic expansion valve (may be a mechanical expansion valve) which decompresses and expands the refrigerant, a heat absorber 9 (another indoor heat exchanger) disposed in the air flow passage 3 to let the refrigerant absorb heat from interior and exterior of the vehicle during the cooling and during the dehumidifying and heating, an evaporation capability control valve 11 to adjust an evaporation capability in the heat absorber 9, an accumulator 12, and others, thereby constituting a refrigerant circuit R.

It is to be noted that the outdoor heat exchanger 7 is disposed outside the vehicle interior, and in this outdoor heat exchanger 7, an outdoor blower 15 is provided to perform the heat exchange between the outdoor air and the refrigerant when the vehicle stops. Furthermore, the outdoor heat exchanger 7 has a header portion 14 (a receiver tank) and a subcooling portion 16 successively on a refrigerant downstream side, a refrigerant pipe 13A extending out from the outdoor heat exchanger 7 is connected to the header portion 14 via a solenoid valve 17 (an opening/closing valve) to be opened during the cooling, and an outlet of the subcooling portion 16 is connected to the indoor expansion valve 8 via a check valve 18. The header portion 14 and the subcooling portion 16 structurally constitute a part of the outdoor heat exchanger 7, and an indoor expansion valve 8 side of the check valve 18 is a forward direction.

Additionally, a refrigerant pipe 13B between the check valve 18 and the indoor expansion valve 8 is disposed in a heat exchange relation with a refrigerant pipe 13C extending out from the evaporation capability control valve 11 positioned on an outlet side of the heat absorber 9, and both the pipes constitute an internal heat exchanger 19. In consequence, the refrigerant flowing into the indoor expansion valve 8 through the refrigerant pipe 13B is cooled (subcooled) by the low-temperature refrigerant flowing out from the heat absorber 9 through the evaporation capability control valve 11.

In addition, the refrigerant pipe 13A extending out from the outdoor heat exchanger 7 branches, and this branching refrigerant pipe 13D communicates and connects with the refrigerant pipe 13C on a downstream side of the internal heat exchanger 19 via a solenoid valve 21 (an opening/closing valve) to be opened during the heating. Furthermore, a refrigerant pipe 13E on an outlet side of the radiator 4 branches before the outdoor expansion valve 6, and this branching refrigerant pipe 13F communicates and connects with the refrigerant pipe 13B on a downstream side of the check valve 18 via a solenoid valve 22 (an opening/closing valve) to be opened during the dehumidifying.

Additionally, in the air flow passage 3 on an air upstream side of the heat absorber 9, respective suction ports such as an indoor air suction port and an outdoor air suction port are formed (represented by a suction port 25 in FIG. 1), and in the suction port 25, a suction changing damper 26 is disposed to change the air to be introduced into the air flow passage 3 to indoor air which is air of the vehicle interior (an indoor air circulating mode) and outdoor air which is air outside the vehicle interior (an outdoor air introducing mode). Furthermore, on an air downstream side of the suction changing damper 26, an indoor blower (a blower fan) 27 is disposed to supply the introduced indoor or outdoor air to the air flow passage 3.

Furthermore, in FIG. 1, 23 denotes a heating medium circulating circuit as an auxiliary heating device disposed in the vehicle air conditioning device 1 of the embodiment. The heating medium circulating circuit 23 is constituted of a circulating pump 30 constituting a circulating device, a heating medium heating electric heater 35 (a PTC heater), and a heating medium-air heat exchanger 40 disposed to flow of air of the air flow passage 3 in the air flow passage 3 on an air upstream side of the radiator 4 in the embodiment, and these components are successively annularly connected to one another by a heating medium pipe 23A. It is to be noted that as a heating medium to circulate in the heating medium circulating circuit 23, for example, water, a refrigerant such as HFO-1234yf, a coolant or the like is employed.

Then, when the circulating pump 30 is operated and the heating medium heating electric heater 35 is energized to heat, the heating medium (the high-temperature heating medium) heated by the heating medium heating electric heater 35 circulates through the heating medium-air heat exchanger 40. Consequently, the air flowing through the heat absorber 9 of the air flow passage 3 into the radiator 4 heats. When the controller 32 judges that a heating capability of the radiator 4 runs short in a heating mode as described later, or when the controller judges that it is necessary to stop the heating by the radiator 4, thereby changing to the heating only by the heating medium circulating circuit 23 (the heating medium-air heat exchanger 40), the controller energizes the heating medium heating electric heater 35 to heat, and operates the circulating pump 30 to execute the heating by the heating medium-air heat exchanger 40 of the heating medium circulating circuit 23.

That is, the heating medium-air heat exchanger 40 of the heating medium circulating circuit 23 becomes a so-called heater core, to complement the heating of the vehicle interior or to heat the vehicle interior in place of the radiator 4. It is to be noted that the employing of the heating medium circulating circuit 23 improves electric safety of passengers.

Furthermore, in the air flow passage 3 on the air upstream side of the heating medium-air heat exchanger 40 and the radiator 4, an air mix damper 28 is disposed to adjust a degree at which the indoor air or outdoor air passes through the radiator 4. Further in the air flow passage 3 on the air downstream side of the radiator 4, there is formed each outlet (represented by an outlet 29 in FIG. 1) of foot, vent or defroster, and in the outlet 29, an outlet changing damper 31 is disposed to execute changing control of blowing of the air from each outlet mentioned above.

Figure 2:
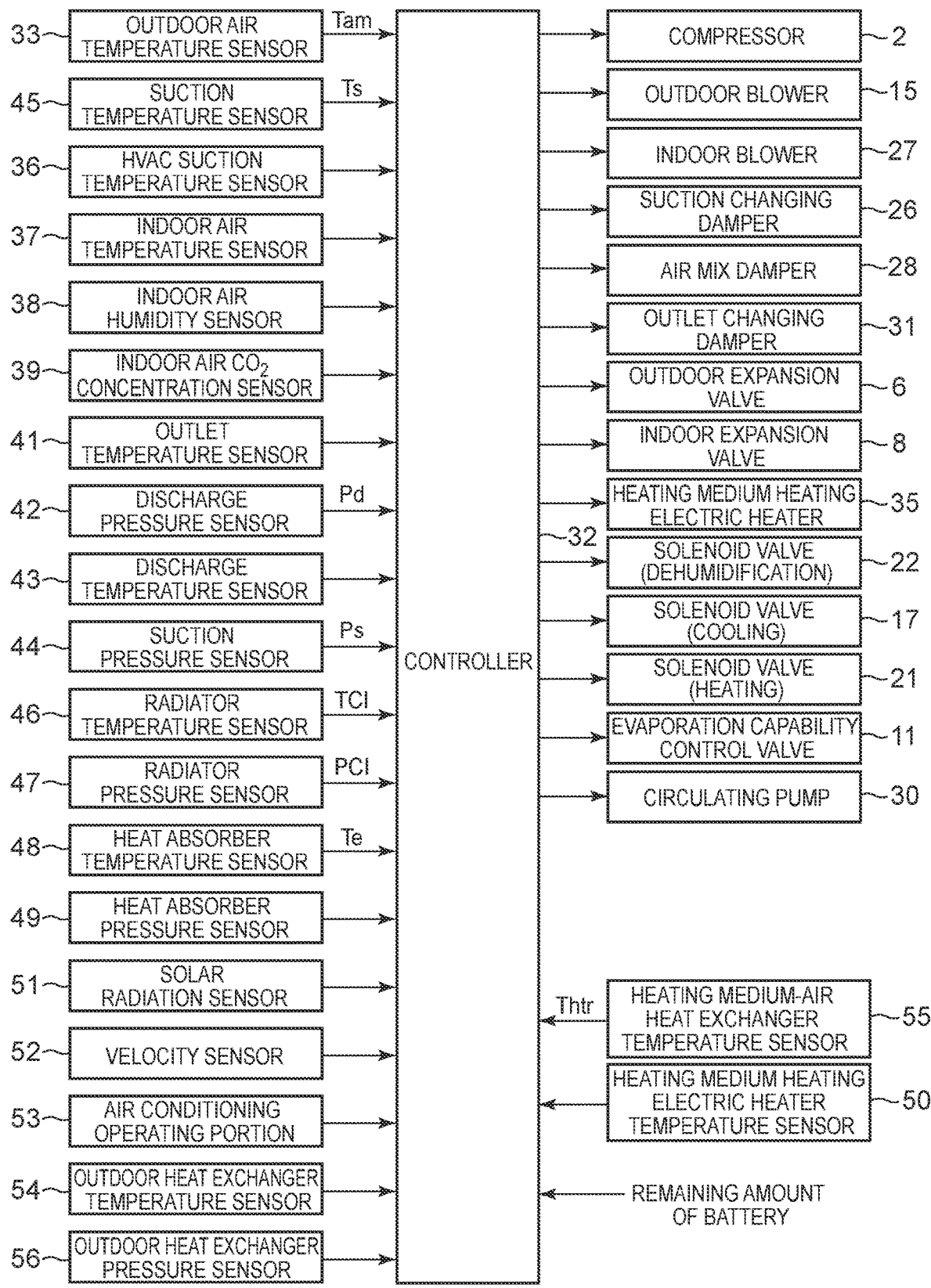
FIG. 2 is a block diagram of an electric circuit of a controller of the vehicle air conditioning device of FIG. 1.

Next, in FIG. 2, 32 is a controller (ECU) that is a control device constituted of a microcomputer including a processor, and an input of the controller 32 is connected to respective outputs of an outdoor air temperature sensor 33 which detects an outdoor air temperature Tam of the vehicle, a suction temperature sensor 45 which detects a suction refrigerant temperature Ts of the compressor 2, an HVAC suction temperature sensor 36 which detects a temperature of the air to be sucked from the suction port 25 to the air flow passage 3, an indoor air temperature sensor 37 which detects a temperature of the air of the vehicle interior (the indoor air), an indoor air humidity sensor 38 which detects a humidity of the air of the vehicle interior, an indoor air $CO_2$ concentration sensor 39 which detects a carbon dioxide concentration of the vehicle interior, an outlet temperature sensor 41 which detects a temperature of the air to be blown out from the outlet 29 to the vehicle interior, a discharge pressure sensor 42 which detects a pressure Pd of the refrigerant discharged from the compressor 2, a discharge temperature sensor 43 which detects a temperature of the refrigerant discharged from the compressor 2, a suction pressure sensor 44 which detects a pressure Ps of the refrigerant to be sucked into the compressor 2, a radiator temperature sensor 46 which detects a temperature TCI of the radiator 4 (the temperature of the air flowing through the radiator 4 toward the outlet 29 in the embodiment), a radiator pressure sensor 47 which detects a refrigerant pressure PCI of the radiator 4 (the pressure of the refrigerant in the radiator 4 or immediately after the refrigerant flows out from the radiator 4, or a high pressure of the refrigerant circuit R), a heat absorber temperature sensor 48 which detects a temperature Te of the heat absorber 9 (the temperature of the heat absorber 9 itself or the temperature of the air cooled in the heat absorber 9), a heat absorber pressure sensor 49 which detects a refrigerant pressure of the heat absorber 9 (the pressure of the refrigerant in the heat absorber 9 or immediately after the refrigerant flows out from the heat absorber 9), a solar radiation sensor 51 of, e.g., a photo sensor system to detect a solar radiation amount into the vehicle, a velocity sensor 52 to detect a moving speed (a velocity VSP) of the vehicle, an air conditioning operating portion 53 to set the changing of the temperature or the operation mode, an outdoor heat exchanger temperature sensor 54 which detects a temperature of the outdoor heat exchanger 7 (an evaporation temperature TXO of the refrigerant of the outdoor heat exchanger 7), and an outdoor heat exchanger pressure sensor 56 which detects a refrigerant pressure of the outdoor heat exchanger 7.

Furthermore, the input of the controller 32 is further connected to respective outputs of a heating medium heating electric heater temperature sensor 50 which detects a temperature of the heating medium heating electric heater 35 of the heating medium circulating circuit 23, and a heating medium-air heat exchanger temperature sensor 55 which detects a temperature (hereinafter referred to as an auxiliary heater temperature Thtr) of the heating medium-air heat exchanger 40. Additionally, information on a remaining amount of a battery that is an amount of the power charged in the battery mounted in the vehicle is also input into the controller 32.

On the other hand, an output of the controller 32 is connected to the compressor 2, the outdoor blower 15, the indoor blower (the blower fan) 27, the suction changing damper 26, the air mix damper 28, the outlet changing damper 31, the outdoor expansion valve 6, the indoor expansion valve 8, the respective solenoid valves 22, 17 and 21, the circulating pump 30, the heating medium heating electric heater 35 and the evaporation capability control valve 11. Then, the controller 32 controls these components on the basis of the outputs of the respective sensors and the setting input by the air conditioning operating portion 53.

Next, an operation of the vehicle air conditioning device 1 of the embodiment having the above constitution will be described. In the embodiment, the controller 32 switches among and executes respective roughly divided operation modes of the heating mode, a dehumidifying and heating mode, an internal cycle mode, a dehumidifying and cooling mode, and a cooling mode. Description will initially be made as to a flow of the refrigerant in each operation mode.

(1) Heating Mode

When the heating mode is selected by the controller 32 or a manual operation to the air conditioning operating portion 53, the controller 32 opens the solenoid valve 21 and closes the solenoid valve 17 and the solenoid valve 22. Then, the controller operates the compressor 2 and the respective blowers 15 and 27, and the air mix damper 28 has a state of passing the air blown out from the indoor blower 27 through the heating medium-air heat exchanger 40 and the radiator 4. In consequence, a high-temperature high-pressure gas refrigerant discharged from the compressor 2 flows into the radiator 4. The air in the air flow passage 3 passes through the radiator 4, and the air in the air flow passage 3 heats by the heating medium-air heat exchanger 40 (when the heating medium circulating circuit 23 operates) and then by a high-temperature refrigerant in the radiator 4. On the other hand, the refrigerant in the radiator 4 has the heat taken by the air and is cooled to condense and liquefy.

The refrigerant liquefied in the radiator 4 flows through the refrigerant pipe 13E to reach the outdoor expansion valve 6 in which the refrigerant is decompressed, and then the refrigerant flows into the outdoor heat exchanger 7. The refrigerant flowing into the outdoor heat exchanger 7 evaporates, and the heat is pumped up from the outdoor air passed by running therein or the outdoor blower 15 (a heat pump). Then, the low-temperature refrigerant flowing out from the outdoor heat exchanger 7 flows through the refrigerant pipe 13D and the solenoid valve 21 and flows from the refrigerant pipe 13C into the accumulator 12 to perform gas-liquid separation therein, and the gas refrigerant is then sucked into the compressor 2, thereby repeating this circulation. The air heated in the heating medium-air heat exchanger 40 or the radiator 4 is blown out from the outlet 29, thereby heating the vehicle interior.

The controller 32 calculates a target radiator pressure PCO (a target value of the pressure of the radiator 4 which is a target value of the high pressure) from a target radiator temperature TCO (a target value of the temperature of the radiator 4) calculated from an after-mentioned target outlet temperature TAO, and controls a number of revolution NC of the compressor 2 on the basis of this target radiator pressure PCO and the refrigerant pressure of the radiator 4 which is detected by the radiator pressure sensor 47 (the radiator pressure PCI that is a high pressure of the refrigerant circuit R). Furthermore, the controller controls a valve position of the outdoor expansion valve 6 on the basis of the temperature (the radiator temperature TCI) of the radiator 4 which is detected by the radiator temperature sensor 46 and the radiator pressure PCI detected by the radiator pressure sensor 47, and controls a subcool degree SC of the refrigerant in an outlet of the radiator 4. The target radiator temperature TCO is basically adjusted to TCO=TAO, but a predetermined limit of controlling is provided.

(2) Dehumidifying and Heating Mode

Next, in the dehumidifying and heating mode, the controller 32 opens the solenoid valve 22 in the above state of the heating mode. In consequence, a part of the condensed refrigerant flowing through the radiator 4 and the refrigerant pipe 13E is distributed, and this part of the refrigerant flows through the solenoid valve 22, the refrigerant pipes 13F and 13B and the internal heat exchanger 19 to reach the indoor expansion valve 8. The refrigerant is decompressed in the indoor expansion valve 8 and then flows into the heat absorber 9 to evaporate. By a heat absorbing operation at this time, water in the air blown out from the indoor blower 27 coagulates to adhere to the heat absorber 9, and hence the air is cooled and dehumidified.

The refrigerant evaporated in the heat absorber 9 flows through the evaporation capability control valve 11 and the internal heat exchanger 19 to join the refrigerant from the refrigerant pipe 13D in the refrigerant pipe 13C, and then flows through the accumulator 12 to be sucked into the compressor 2, thereby repeating this circulation. The air dehumidified in the heat absorber 9 is reheated in a process of passing the radiator 4, thereby performing the dehumidifying and heating of the vehicle interior.

The controller 32 controls the number of revolution NC of the compressor 2 on the basis of the target radiator pressure PCO calculated from the target radiator temperature TCO and the radiator pressure PCI detected by the radiator pressure sensor 47 (the high pressure of the refrigerant circuit R), and the controller controls the valve position of the outdoor expansion valve 6 on the basis of the temperature (the heat absorber temperature Te) of the heat absorber 9 which is detected by the heat absorber temperature sensor 48.

(3) Internal Cycle Mode

Next, in the internal cycle mode, the controller 32 closes (shuts off) the outdoor expansion valve 6 in the above state of the dehumidifying and heating mode. Specifically, it can be considered that this internal cycle mode is a state where the outdoor expansion valve 6 shuts off under the control of the outdoor expansion valve 6 in the dehumidifying and heating mode, and hence the internal cycle mode can be grasped as a part of the dehumidifying and heating mode.

However, the outdoor expansion valve 6 is closed, thereby obstructing inflow of the refrigerant into the outdoor heat exchanger 7, and hence all the condensed refrigerant flowing through the radiator 4 and the refrigerant pipe 13E flows through the solenoid valve 22 to the refrigerant pipe 13F. Then, the refrigerant flowing through the refrigerant pipe 13F flows from the refrigerant pipe 13B through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence the air is cooled and dehumidified.

The refrigerant evaporated in the heat absorber 9 flows through the evaporation capability control valve 11, the internal heat exchanger 19, the refrigerant pipe 13C and the accumulator 12 to be sucked into the compressor 2, thereby repeating this circulation. The air dehumidified in the heat absorber 9 is reheated in the process of passing the radiator 4, thereby performing the dehumidifying and heating of the vehicle interior, but in this internal cycle mode, the refrigerant circulates between the radiator 4 (heat radiation) and the heat absorber 9 (heat absorption) which are present in the air flow passage 3 on an indoor side, and hence the heat is not pumped up from the outdoor air, but the heating capability is exerted for a consumed power of the compressor 2 which is added to an amount of heat absorbed in the heat absorber 9. The whole amount of the refrigerant flows through the heat absorber 9 which exerts a dehumidifying operation, and hence, as compared with the above dehumidifying and heating mode, a dehumidifying capability increases, but the heating capability decreases.

Furthermore, the controller 32 controls the number of revolution of the compressor 2 on the basis of the temperature of the heat absorber 9 or the above-mentioned high pressure of the refrigerant circuit R. At this time, the controller 32 selects a smaller compressor target number of revolution from compressor target numbers of revolution obtainable by calculations from the temperature Te of the heat absorber 9 and the high pressure PCI, to control the compressor 2.

(4) Dehumidifying and Cooling Mode

Next, in the dehumidifying and cooling mode, the controller 32 opens the solenoid valve 17 and closes the solenoid valve 21 and the solenoid valve 22. Then, the controller operates the compressor 2 and the respective blowers 15 and 27, and the air mix damper 28 has the state of passing the air blown out from the indoor blower 27 through the heating medium-air heat exchanger 40 and the radiator 4. Consequently, the high-temperature high-pressure gas refrigerant discharged from the compressor 2 flows into the radiator 4. The air in the air flow passage 3 passes through the radiator 4, and hence the air in the air flow passage 3 is heated by the high-temperature refrigerant in the radiator 4 (the heating medium circulating circuit 23 is stopped), while the refrigerant in the radiator 4 has the heat taken by the air and is cooled to condense and liquefy.

The refrigerant flowing out from the radiator 4 flows through the refrigerant pipe 13E to reach the outdoor expansion valve 6, and flows through the outdoor expansion valve 6 controlled to slightly open, to flow into the outdoor heat exchanger 7. The refrigerant flowing into the outdoor heat exchanger 7 is cooled by the running therein or the outdoor air passed through the outdoor blower 15, to condense. The refrigerant flowing out from the outdoor heat exchanger 7 flows from the refrigerant pipe 13A through the solenoid valve 17 to successively flow into the header portion 14 and the subcooling portion 16. Here, the refrigerant is subcooled.

The refrigerant flowing out from the subcooling portion 16 of the outdoor heat exchanger 7 flows through the check valve 18 to enter the refrigerant pipe 13B, and flows through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence the air is cooled and dehumidified.

The refrigerant evaporated in the heat absorber 9 flows through the evaporation capability control valve 11, the internal heat exchanger 19 and the refrigerant pipe 13C to reach the accumulator 12, and flows therethrough to be sucked into the compressor 2, thereby repeating this circulation. The air cooled and dehumidified in the heat absorber 9 is reheated in the process of passing the radiator 4 (a radiation capability is smaller than that during the heating), thereby performing the dehumidifying and cooling of the vehicle interior.

The controller 32 controls the number of revolution of the compressor 2 on the basis of the temperature (the heat absorber temperature Te) of the heat absorber 9 which is detected by the heat absorber temperature sensor 48, also controls the valve position of the outdoor expansion valve 6 on the basis of the above-mentioned high pressure of the refrigerant circuit R (the radiator pressure PCI), and controls the refrigerant pressure (the radiator pressure PCI) of the radiator 4.

(5) Cooling Mode

Next, in the cooling mode, the controller 32 fully opens the valve position of the outdoor expansion valve 6 in the above state of the dehumidifying and cooling mode. The controller 32 controls the air mix damper 28, and adjusts a ratio at which the air in the air flow passage 3, blown out from the indoor blower 27 and passed through the heat absorber 9, flows through the heating medium-air heat exchanger 40 and the radiator 4.

In consequence, the high-temperature high-pressure gas refrigerant discharged from the compressor 2 flows from the refrigerant pipe 13G into the radiator 4, and the refrigerant flowing out from the radiator 4 flows through the refrigerant pipe 13E to reach the outdoor expansion valve 6. At this time, the outdoor expansion valve 6 is fully opened, and hence the refrigerant passes the valve and flows into the outdoor heat exchanger 7 as it is, in which the refrigerant is cooled by the running therein or the outdoor air passed through the outdoor blower 15, to condense and liquefy. The refrigerant flowing out from the outdoor heat exchanger 7 flows from the refrigerant pipe 13A through the solenoid valve 17 to successively flow into the header portion 14 and the subcooling portion 16. Here, the refrigerant is subcooled.

The refrigerant flowing out from the subcooling portion 16 of the outdoor heat exchanger 7 flows through the check valve 18 to enter the refrigerant pipe 13B, and flows through the internal heat exchanger 19 to reach the indoor expansion valve 8. The refrigerant is decompressed in the indoor expansion valve 8 and then flows into the heat absorber 9 to evaporate. The air blown out from the indoor blower 27 is cooled by the heat absorbing operation at this time.

The refrigerant evaporated in the heat absorber 9 flows through the evaporation capability control valve 11, the internal heat exchanger 19 and the refrigerant pipe 13C to reach the accumulator 12, and flows therethrough to be sucked into the compressor 2, thereby repeating this circulation. The air cooled and dehumidified in the heat absorber 9 is blown out from the outlet 29 to the vehicle interior (a part of the air passes the radiator 4 to perform heat exchange), thereby performing the cooling of the vehicle interior. In this cooling mode, the controller 32 controls the number of revolution of the compressor 2 on the basis of the temperature (the heat absorber temperature Te) of the heat absorber 9 which is detected by the heat absorber temperature sensor 48. Then, the controller 32 selects and switches among the above respective operation modes in accordance with the outdoor air temperature and the target outlet temperature.

(6) Compressor in Heating Mode and Control of Heating Medium Circulating Circuit Next, description will be made with reference to FIG. 3 to FIG. 9 as to control of the compressor 2 and the heating medium circulating circuit 23 by the controller 32 in the above-mentioned heating mode.

(6-1) Calculation of Target Number of Revolution TGNCh of Compressor by High Pressure The controller 32 calculates the target outlet temperature TAO from Equation (1) mentioned below. The target outlet temperature TAO is a target value of the temperature of the air to be blown out from the outlet 29 to the vehicle interior.

$$TAO=(Tset-Tin) \times K+Tbal(f(Tset,SUN,Tam)) \quad \text{Equation (1),}$$

in which Tset is a predetermined temperature of the vehicle interior which is set by the air conditioning operating portion 53, Tin is a temperature of the vehicle interior air which is detected by the indoor air temperature sensor 37, K is a coefficient, and Tbal is a balance value calculated from the predetermined temperature Tset, a solar radiation amount SUN detected by the solar radiation sensor 51, and the outdoor air temperature Tam detected by the outdoor air temperature sensor 33. Furthermore, in general, the lower the outdoor air temperature Tam is, the higher the target outlet temperature TAO becomes, and the higher the outdoor air temperature Tam is, the lower the target outlet temperature becomes. The controller 32 calculates the target radiator temperature TCO from the target outlet temperature TAO.

Figure 4:
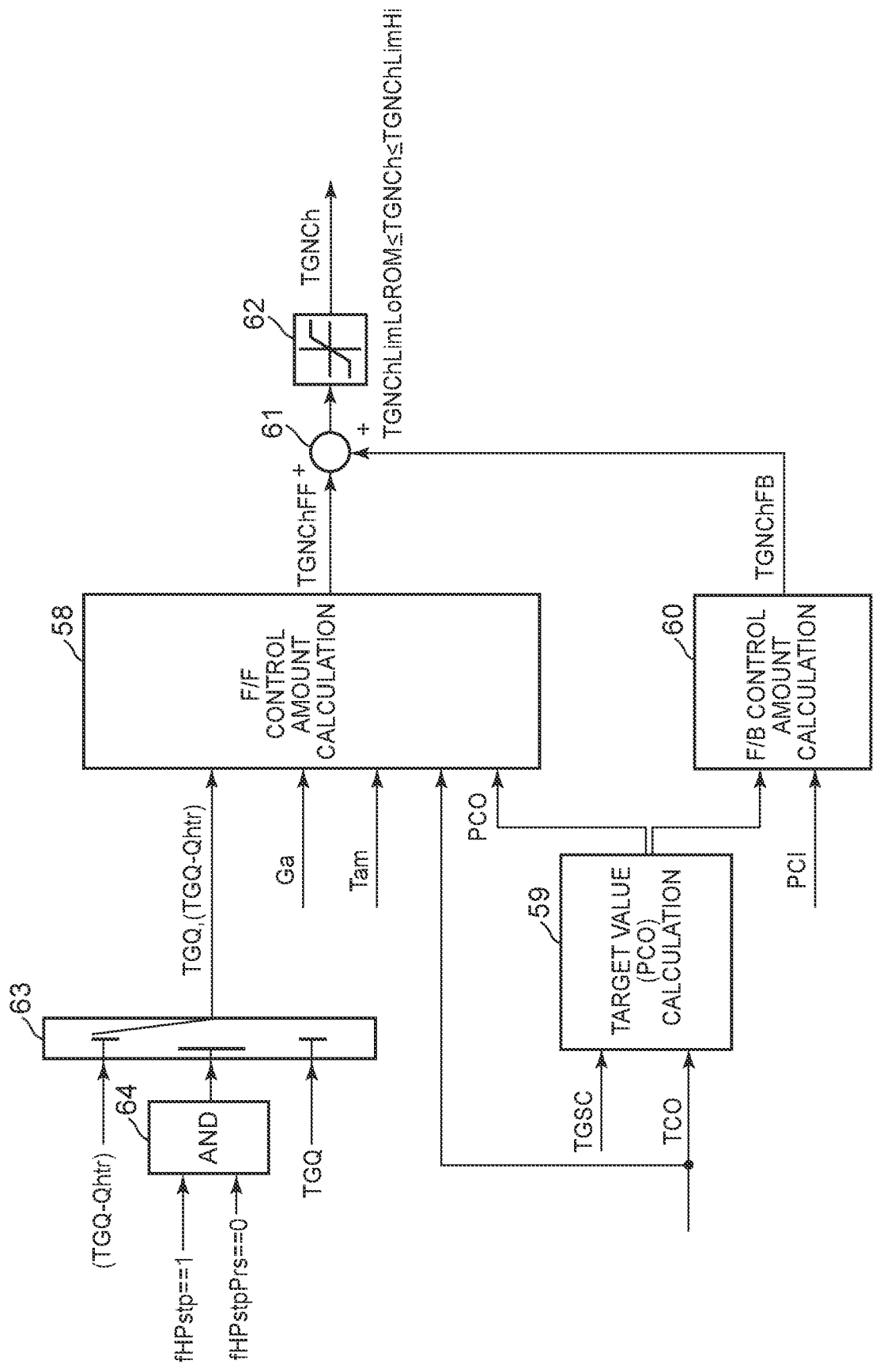
FIG. 4 is a control block diagram concerning compressor control of the controller of FIG. 2.

Next, FIG. 4 is a control block diagram of the controller 32 which determines a target number of revolution TGNCh of the compressor 2 (a compressor target number of revolution) for the heating mode. A F/F (feedforward) control amount calculation section 58 of the controller 32 calculates a F/F control amount TGNChff of the compressor target number of revolution by feedforward calculation based on an after-mentioned required capability TGQ that is the heating capability required for the radiator 4, a mass air volume Ga of the air flowing into the air flow passage 3 (which is calculated from a target value of a blower voltage BLV of the indoor blower 27 or the current blower voltage BLV), the outdoor air temperature Tam obtainable from the outdoor air temperature sensor 33, the above-mentioned target radiator temperature TCO that is a target value of the temperature of the radiator 4, and the target radiator pressure PCO that is a target value of the pressure of the radiator 4.

It is to be noted that the required capability TGQ input into the F/F control amount calculation section 58 is replaced with (TGQ−Qhtr) in after-mentioned shifting control. This replacement is performed by a changing section 63 of FIG. 4. An output of an AND gate 64 is input into the changing section 63, and the AND gate 64 is configured to output, to the F/F control amount calculation section 58, the value (TGQ−Qhtr) obtained by subtracting, from the required capability TGQ, an (after-mentioned) HTR actual capability Qhtr that is a heating capability actually generated by the auxiliary heating device, when an after-mentioned HP stop judgment flag fHPstp is set to "1" and an after-mentioned HP stop flag fHPstpPrs is reset to "0" (the shifting control), and in another case, the AND gate is configured to output the required capability TGQ to the F/F control amount calculation section 58.

Therefore, when the HP stop judgment flag fHPstp is set to "1" and the after-mentioned HP stop flag fHPstpPrs is reset to "0" (the shifting control), the F/F control amount calculation section 58 calculates the F/F control amount TGNChff of the compressor target number of revolution by the feedforward calculation based on (TGQ−Qhtr), the mass air volume Ga, the outdoor air temperature Tam, the target radiator temperature TCO and the target radiator pressure PCO, and in the other case (a case other than the shifting control), the F/F control amount calculation section calculates the F/F control amount TGNChff of the compressor target number of revolution TGNCh by the feedforward calculation based on the required capability TGQ, the mass air volume Ga, the outdoor air temperature Tam, the target radiator temperature TCO, and the target radiator pressure PCO. Description will be made later in detail as to the shifting control and the HTR actual capability Qhtr.

A target value calculation section 59 calculates the target radiator pressure PCO on the basis of a target subcool degree TGSC that is a target value of the subcool degree SC in the outlet of the radiator 4 and the target radiator temperature TCO. Furthermore, a F/B (feedback) control amount calculation section 60 calculates a F/B control amount TGNChfb of the compressor target number of revolution by feedback calculation based on the target radiator pressure PCO and the radiator pressure PCI (the high pressure) that is the refrigerant pressure of the radiator 4. Then, an adder 61 adds the F/F control amount TGNChff calculated by the F/F control amount calculation section 58 and the F/B control amount TGNChfb calculated by the F/B control amount calculation section 60, a limit setting section 62 attaches limits of an upper limit of controlling and a lower limit of controlling, and then the compressor target number of revolution TGNCh is determined. In the heating mode, the controller 32 controls the number of revolution NC of the compressor 2 on the basis of the compressor target number of revolution TGNCh.

(6-2) Capability Calculation

Hereinafter, description will be made as to an example of specific control of the controller 32 in the heating mode with reference to flowcharts of FIG. 5 and FIG. 6. In this example, the controller 32 adjusts the number of revolution NC of the compressor 2 to a maximum number of revolution under its conditions to operate the compressor 2, and complements a shortage of the heating capability of the radiator 4 with the heating by the heating medium circulating circuit 23 (the heating medium-air heat exchanger 40). Specifically, in step S1 of FIG. 5, the controller 32 judges whether or not it is judged that failure occurs in the heat pump (denoted with HP in FIG. 5) constituted of the refrigerant circuit R of the vehicle air conditioning device 1, and when the failure occurs (N), the controller stops the heat pump (the compressor 2) in step S14.

In a normal case (Y) where the failure is not judged in the step S1, the controller advances to step S2 to judge whether or not the operation mode of the vehicle air conditioning device 1 is the heating mode at present. In the case of a mode other than the heating mode (N), the controller shifts to the other operation mode, and in the heating mode (Y), the controller advances to step S3. In the step S3, the controller 32 calculates the required capability TGQ (kW) that is the required heating capability of the radiator 4, an HP maximum capability estimated value Qmax (kW) that is an estimated value of a maximum heating capability of the radiator 4, a total capability Qtotal (kW) that is a total heating capability to be actually generated by the radiator 4 and the heating medium circulating circuit 23 (including the heating medium-air heat exchanger 40, and this also applies below), the above-mentioned HTR actual capability Qhtr (kW) that is the heating capability to be actually generated by the heating medium circulating circuit 23, and the HP actual capability Qhp (kW) that is the heating capability to be actually generated by the radiator 4 by use of Equation (2), Equation (3), Equation (4), Equation (5) and Equation (6) mentioned below.

$TGQ=(TCO-Te) \times Cpa \times \text{actual } Ga \times \gamma aTe \times 1.16$   Equation (2)

$Qmax=f(Tam, Ga, NCmax, Thtr-Te)$   Equation (3)

$Qtotal=(TCI-Te) \times Cpa \times \text{actual } Ga \times (SW/100) \times \gamma aTe \times 1.16$   Equation (4)

$Qhtr=(Thtr-Te) \times Cpa \times \text{actual } Ga \times (SW/100) \times \gamma aTe \times 1.16$   Equation (5)

$Qhp=(TCI-Thtr) \times Cpa \times \text{actual } Ga \times (SW/100) \times \gamma aTe \times 1.16$   Equation (6)

Figure 3:
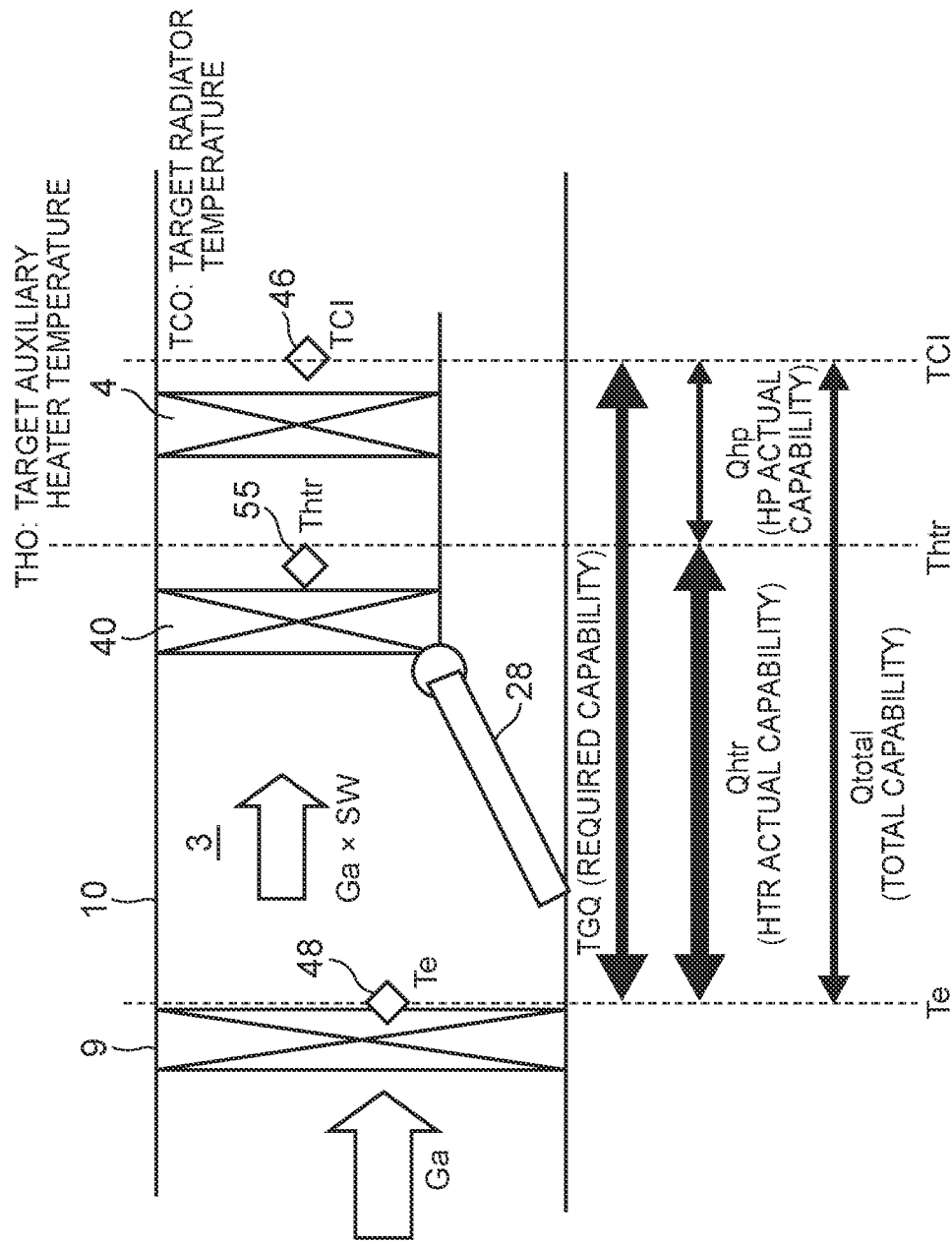
FIG. 3 is an enlarged view of an air flow passage portion of the vehicle air conditioning device of FIG. 1.

FIG. 3 shows a relation among the required capability TGQ, the total capability Qtotal, the HP actual capability Qhp, and the HTR actual capability Qhtr. It is to be noted that Te is the heat absorber temperature, Cpa is constant pressure specific heat (kJ/m³·K) of air, actual Ga is an actual air volume (an actual system air volume m³/s) of the air flowing through the air flow passage 3, γaTe is an air specific weight, 1.16 is a coefficient to match a unit, NCmax is the maximum number of revolution of the compressor 2 under the conditions, Thtr is the auxiliary heater temperature that is a temperature of the heating medium-air heat exchanger 40, TCI is the radiator temperature, and SW is a position of the air mix damper 28.

Furthermore, the controller 32 calculates a difference ΔQmax between the required capability TGQ and the HP maximum capability estimated value Qmax and a difference ΔQtotal between the required capability TGQ and the total capability Qtotal by use of Equation (7) and Equation (8) mentioned below.

$\Delta Qmax = TGQ - Qmax$   Equation (7)

$\Delta Qtotal = TGQ - Qtotal$   Equation (8)

Next, in step S4, the controller 32 judges whether or not to stop the heat pump (the compressor 2) in accordance with the frosting to the outdoor heat exchanger 7, or the like (HP stop judgement). Description will be made later in detail as to this HP stop judgment. When a judgment to stop the heat pump (the compressor 2) is made, the controller 32 sets the HP stop judgment flag fHPstp to "1", and when the judgment to stop the heat pump is not made, the controller resets the HP stop judgment flag fHPstp to "0".

Here, when it is judged in the step S4 that the judgment to stop the heat pump (the compressor 2) is not made (N, HP operation), the controller 32 adjusts the number of revolution NC of the compressor 2 to the maximum number of revolution under the conditions to operate the compressor 2 in the embodiment. Then, the controller advances to step S5 to execute cooperative control of the heat pump (HP) by the radiator 4 and the heating medium circulating circuit 23 (shown as HP+auxiliary heater cooperative control in FIG. 5).

(6-3) Cooperative Control by Radiator and Heating Medium Circulating Control

Figure 6:
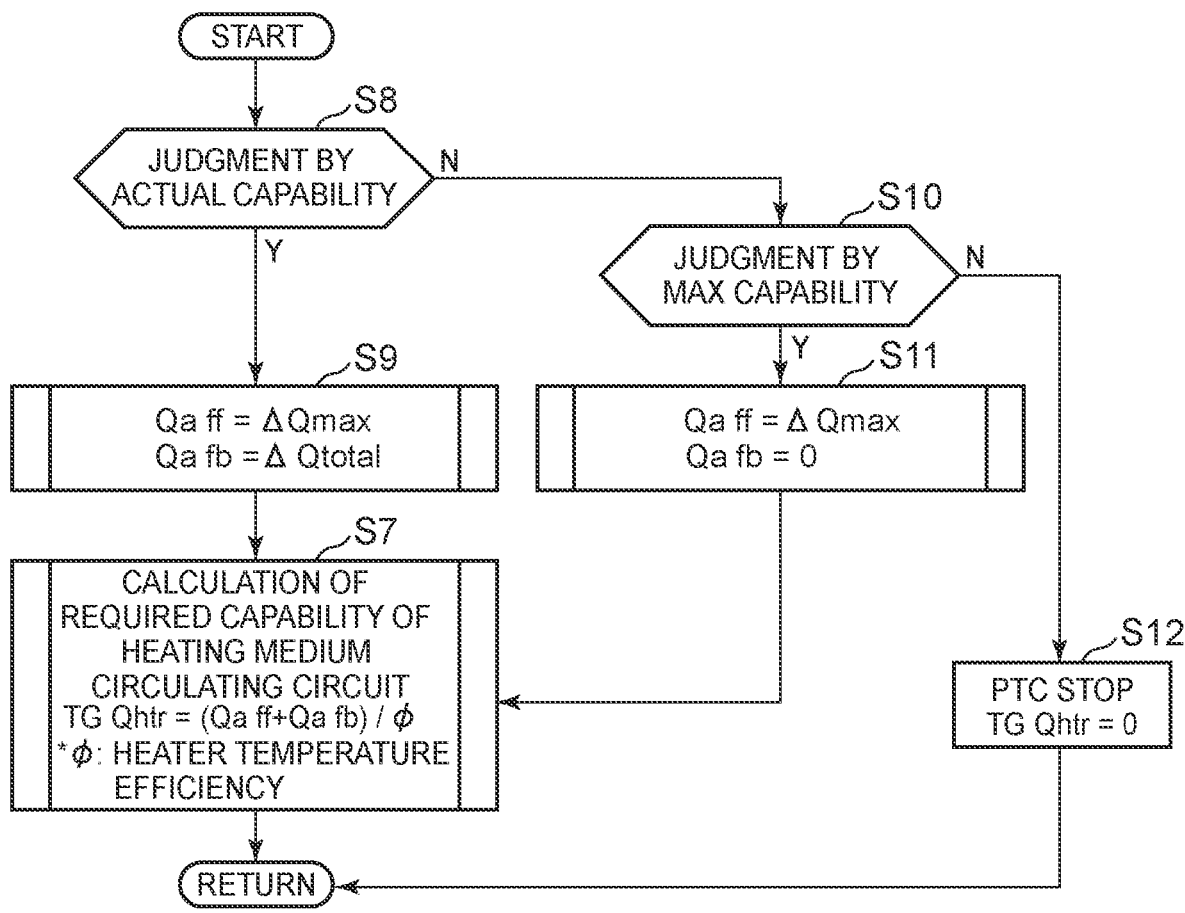
FIG. 6 is a timing chart to explain cooperative control by a radiator and a heating medium circulating circuit (an auxiliary heating device) of FIG. 5.

FIG. 6 shows the cooperative control of the embodiment. The controller 32 makes a judgment by an actual capability in step S8 of the flowchart of FIG. 6. In the embodiment, this judgment by the actual capability is the judgment of whether or not a predetermined time (e.g., 30 seconds or the like) elapses after there are established all conditions that the number of revolution NC of the compressor 2 is the maximum number of revolution, the high pressure of the refrigerant circuit R (the radiator pressure PCI) is stable and ΔQtotal is not less than a predetermined value. When it is judged that the compressor 2 now starts up, the controller 32 judges (N) in the step S8 and advances to step S10 to next make a judgment by a MAX capability.

This judgment by the MAX capability is executed until the high pressure is stabilized immediately after the startup of the compressor 2 (in case of N in the step S8), and in the embodiment, it is judged whether or not the difference ΔQmax (=TGQ−Qmax) between the required capability TGQ and the HP maximum capability estimated value Qmax is more than a predetermined value (a state where the maximum heating capability (an estimated value) of the radiator 4 runs short to the required capability TGQ). When a state where the difference is less than the predetermined value continues for a predetermined time (e.g., 30 seconds or the like), i.e., when the maximum heating capability (the estimated value) of the radiator 4 satisfies the required capability TGQ or is hardly insufficient (N), the controller advances to step S12 to control the heating medium heating electric heater 35 of the heating medium circulating circuit 23 so that the heater is not energized (PTC stop), and adjusts a required capability TGQhtr of the heating medium circulating circuit 23 (the auxiliary heating device) to zero (0).

When the difference ΔQmax (=TGQ−Qmax) between the required capability TGQ and the HP maximum capability estimated value Qmax is not less than the predetermined value (a state where the maximum heating capability (the estimated value) of the radiator 4 runs short to the required capability TGQ) in the step S10 on the startup of the compressor 2 (Y), the controller 32 advances to step S11 to adjust a F/F (feedforward) value Qaff of the required capability TGQhtr of the heating medium circulating circuit 23 to ΔQmax and to set a F/B (feedback) value Qafb to zero.

Next, the controller 32 advances to step S7 to calculate the required capability TGQhtr of the heating medium circulating circuit 23. In the step S7, the controller 32 calculates the required capability TGQhtr of the heating medium circulating circuit 23 by use of Equation (9) mentioned below.

$$TGQhtr=(Qaff+Qafb)/\phi \qquad \text{Equation (9)}$$

It is to be noted that $\phi$ is a temperature efficiency (a heater temperature efficiency) of the heating medium circulating circuit 23 (the heating medium heating electric heater 35).

Furthermore, when the compressor 2 reaches the maximum number of revolution, the difference ΔQtotal between the required capability TGQ and the total capability Qtotal is less than the predetermined value in the step S8 (N), the controller advances to the step S10, and the difference ΔQmax between the required capability TGQ and the HP maximum capability estimated value Qmax is not less than the predetermined value. Also in this case, the controller 32 advances from the step S11 to the step S7 to calculate the required capability TGQhtr of the heating medium circulating circuit 23 by Equation (9) mentioned above. Specifically, in the step S11, Qaff=ΔQmax and Qafb=0, and hence in the step S7, the controller 32 adjusts the required capability TGQhtr of the heating medium circulating circuit 23 to ΔQmax/φ and controls energization of the heating medium heating electric heater 35 on the basis of this required capability TGQhtr.

On the other hand, when the number of revolution NC of the compressor 2 is the maximum number of revolution in the step S8, the high pressure of the refrigerant circuit R (the radiator pressure PCI) is stable and a state where ΔQtotal is not less than the predetermined value continues for a predetermined time (Y), the controller 32 advances to the step S9 to adjust the F/F value Qaff of the required capability TGQhtr of the heating medium circulating circuit 23 to ΔQmax and to adjust the F/B value Qafb to ΔQtotal, and advances to the step S7 to calculate the required capability TGQhtr of the heating medium circulating circuit 23. Specifically, in the step S9, Qaff=ΔQmax and Qafb=Qtotal, and hence in the step S7, the controller 32 adjusts the required capability TGQhtr of the heating medium circulating circuit 23 to (ΔQmax+ΔQtotal)/φ and controls the energization of the heating medium heating electric heater 35 on the basis of this required capability TGQhtr.

By such cooperative control of the heating by the radiator 4 of the heat pump (the refrigerant circuit R) and the heating by the heating medium circulating circuit 23, the controller 32 complements the shortage of the heating capability of the radiator 4 with the heating by the heating medium circulating circuit 23 (the heating medium-air heat exchanger 40) in a state where the number of revolution NC of the compressor 2 is the maximum number of revolution.

Furthermore, as described above, the controller 32 executes F/F control so that Qaff=ΔQmax, Qafb=0 and the required capability TGQhtr=Qmax/φ and executes F/B control so that Qaff=ΔQmax, Qafb=ΔQtotal, and the required capability TGQhtr=(Qmax+Qtotal)/φ, but the controller executes this F/B control so that the total capability Qtotal of the total heating capability actually generated by the radiator 4 and the heating medium circulating circuit 23 (the heating medium-air heat exchanger 40) becomes the required capability TGQ.

Figure 7:
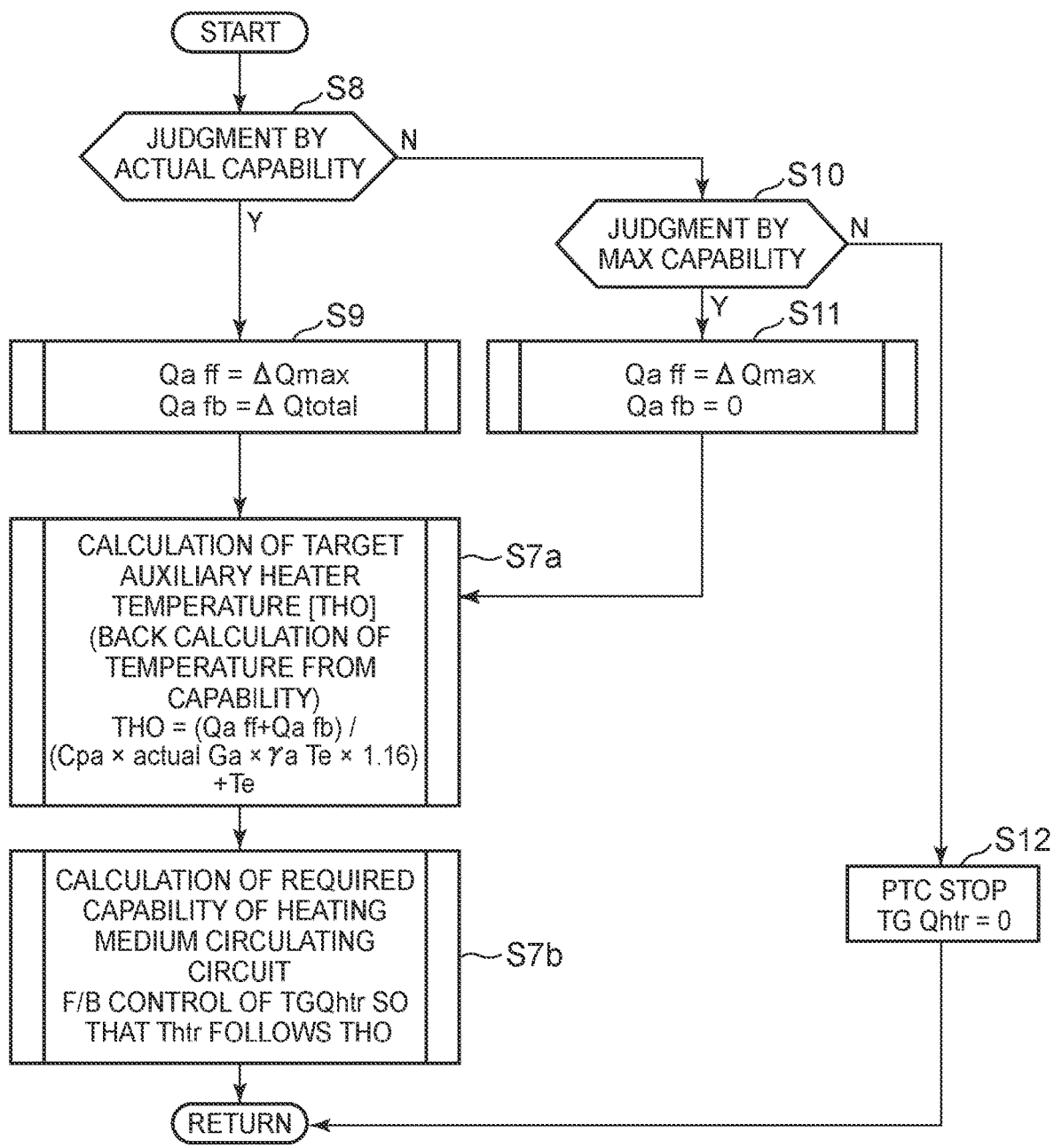
FIG. 7 is a flowchart to explain another example of the cooperative control of FIG. 5.

(6-4) Another Cooperative Control by Radiator and Heating Medium Circulating Control Next, FIG. 7 shows another flowchart of the cooperative control by the controller 32 in the heating mode. It is to be noted that in this drawing, steps denoted with the same reference numerals as in FIG. 6 execute similar control. In this case, the controller advances from step S5, step S9 and step S11 to step S7a and then to step S7b.

In the step S7a of FIG. 7, the controller 32 back calculates a target auxiliary heater temperature THO that is a target value of the auxiliary heater temperature Thtr (the temperature of the heating medium-air heat exchanger 40) from a sum (Qaff+Qafb) of the F/F value Qaff and the F/B value Qafb of the required capability TGQhtr of the heating medium circulating circuit 23 which is determined in the respective steps S5, S9 and S11 by use of Equation (10) mentioned below.

$$THO=(Qaff+Qafb)/(Cpa \times \text{actual } Ga \times \gamma a Te \times 1.16)+Te \qquad \text{Equation (10)}$$

Next, in the step S7b, the controller 32 calculates the required capability TGQhtr of the heating medium circulating circuit 23, but according to the embodiment, in this case, the controller 32 calculates the required capability TGQhtr of the heating medium circulating circuit 23 by PID calculation based on a deviation e between the target auxiliary heater temperature THO back calculated in the step S7a and the auxiliary heater temperature Thtr detected by the heating medium-air heat exchanger temperature sensor 55, and controls the energization of the heating medium heating electric heater 35 on the basis of the calculated required capability TGQhtr, thereby executing the feedback (F/B) control so that the auxiliary heater temperature Thtr follows the target auxiliary heater temperature THO.

(6-5) HP Stop Judgment

Next, description will be made as to the HP stop judgment in the step S4 of FIG. 5. In this HP stop judgment, three conditions mentioned below are judged.

(6-5-1) HP Stop Judgment by Frosting Proceeding of Outdoor Heat Exchanger 7

When the frosting of the outdoor heat exchanger 7 enlarges, heat absorption (the heat pump) from the outdoor air cannot be performed even by the operation of the compressor 2 of the refrigerant circuit R, and an operation efficiency also remarkably deteriorates. To eliminate the problems, in the embodiment, the controller judges that the frosting of the outdoor heat exchanger 7 proceeds when one of the following conditions is established:

(a) the condition that a state where (TCO−TCI)≥a predetermined value (a predetermined large value of, e.g., 5 degrees) and ΔTXO≥a predetermined value (a predetermined large value of, e.g., 10 degrees) continues for a predetermined time (e.g., 30 seconds), and (b) the condition that a state where ΔTXO≥the predetermined value (a value smaller than that of the above (a), e.g., 5 degrees) continues for a predetermined time (longer than that of the above (a), e.g., 60 minutes).

The above (TCO−TCI) is a difference between the target radiator temperature TCO and the radiator temperature TCI, and ΔTXO is a frosting judgment value (ΔTXO=TXObase−TXO) that is a difference between a refrigerant evaporation temperature TXObase of the outdoor heat exchanger 7 without the frosting and the current refrigerant evaporation temperature TXO, thereby indicating a frosting degree (a frosting ratio) of the outdoor heat exchanger 7. Specifically, the above (a) indicates a state where the radiator temperature TCI is lower than the target radiator temperature TCO and the frosting ratio (ΔTXO) increases, the above (b) indicates that a state where the frosting ratio (ΔTXO) increases to a certain degree continues long, and both the conditions indicate that the frosting of the outdoor heat exchanger 7 proceeds.

(6-5-2) HP Stop Judgment by Ts

Additionally, when the suction refrigerant temperature Ts of the compressor 2 lowers and the number of revolution NC of the compressor 2 decreases, the operation efficiency of the compressor 2 decreases, and reliability also deteriorates. Therefore, in the embodiment, it is judged that the operation efficiency of the compressor 2 deteriorates, when the following condition is established:

(c) the condition that a state where Ts≤a predetermined value (a predetermined low value of, e.g., −25° C.) and NC≤a predetermined value (a predetermined low value of, e.g., 1000 rpm) continues for a predetermined time (e.g., 30 seconds).

(6-5-3) HP Stop Judgment by Heat Absorption in Radiator 4

In addition, when frost to the outdoor heat exchanger 7 grows, an efficiency of the heat exchange between the refrigerant and the outdoor air deteriorates. Therefore, an amount of heat to be absorbed from the outdoor air decreases, and hence the heating capability generated by the radiator 4 also decreases. Furthermore, when the outdoor air temperature lowers, a density of the refrigerant to be sucked into the compressor 2 decreases, and hence also in this case, the heating capability generated by the radiator 4 decreases. On the other hand, the heating medium circulating circuit 23 operates to compensate for this decrease of the heating capability of the radiator 4 as described above. Therefore, when the heating capability of the radiator 4 decreases, there occurs a case where the heating capability of the heating medium circulating circuit 23 eventually becomes larger than the heating capability of the radiator 4.

In this case, especially when the heating medium-air heat exchanger 40 of the heating medium circulating circuit 23 is disposed on the air upstream side of the radiator 4 as in the embodiment, there occurs a phenomenon where the refrigerant in the radiator 4 absorbs heat from the air heated by the heating medium-air heat exchanger 40 and flowing into the radiator 4. When this heat absorption phenomenon occurs, the total capability Qtotal decreases, the required capability TGQ cannot be satisfied and the vehicle interior cannot comfortably be heated. Furthermore, the power of the compressor 2 is wasted to generate the heating capability of the radiator 4, thereby consuming extra power and decreasing a total COP. Consequently, in the embodiment, the controller judges that the heat absorption by the radiator 4 occurs when the following condition is established:

(d) the condition that the heating medium heating electric heater 35 of the heating medium circulating circuit 23 is energized, the number of revolution NC of the compressor 2≤a predetermined value (a predetermined low value of, e.g., 2000 rpm), and (Qtotal−the consumed power of the heating medium circulating circuit 23)≤a predetermined value (a predetermined low value of, e.g., 200 W or the total COP<a predetermined value (e.g., 1).

It is to be noted that the total COP=(Qtotal−the consumed power of the heating medium circulating circuit 23)/the consumed power of the compressor 2.

(6-6) Shifting Control

The controller 32 judges that the heat pump (the compressor 2) is to be stopped when one of the above conditions (a) to (d) is established in the step S4. When the judgment to stop the heat pump (the compressor 2) is made in the step S4, the controller 32 sets the HP stop judgment flag fHPstp to "1", advances to step S6 (Y, HP stop, fHPstp=1), and starts the shifting control.

In this shifting control, initially in the step S6, controller 32 makes a stop processing end judgment (an HP stop processing end judgment) of the compressor 2. In the HP stop processing end judgment of this step S6, when the HP stop flag fHPstpPrs is reset to "0", the controller advances to step S13, and when the HP stop flag fHPstpPrs is set to "1" (Y, HP stop processing end), the controller advances to the step S14 to stop the heat pump (the compressor 2).

(6-6-1) Calculation of Number of Revolution of Compressor 2 and Required Capability of Heating Medium Circulating Circuit 23

When the controller advances to the step S6, the HP stop flag fHPstpPrs is reset to "0" (N, the HP stop is being processed), and hence the controller 32 advances to the step S13 to perform HP stop processing calculation. In this HP stop processing calculation, the controller 32 initially adjusts the required capability TGQhtr of the heating medium circulating circuit 23 to TGQ (TGQhtr=TGQ). Furthermore, the HP stop judgment flag fHPstp=1 and the HP stop flag fHPstpPrs=0, and hence the changing section 63 in FIG. 4 replaces the required capability TGQ to be input into the F/F control amount calculation section 58 with (TGQ−Qhtr).

When the required capability TGQhtr of the heating medium circulating circuit 23 is adjusted to the required capability TGQ, the HTR actual capability Qhtr that is the heating capability actually generated by the heating medium circulating circuit 23 (the heating medium-air heat exchanger 40) increases toward the required capability TGQ. On the other hand, when the required capability TGQ input into the F/F control amount calculation section 58 is replaced with (TGQ−Qhtr), the F/F control amount TGNChff decreases as much as the HTR actual capability Qhtr increases, and the compressor target number of revolution TGNCh decreases. Consequently, the HP actual capability Qhp that is the heating capability actually generated by the radiator 4 also decreases in accordance with the increase of the HTR actual capability Qhtr.

Figure 8:
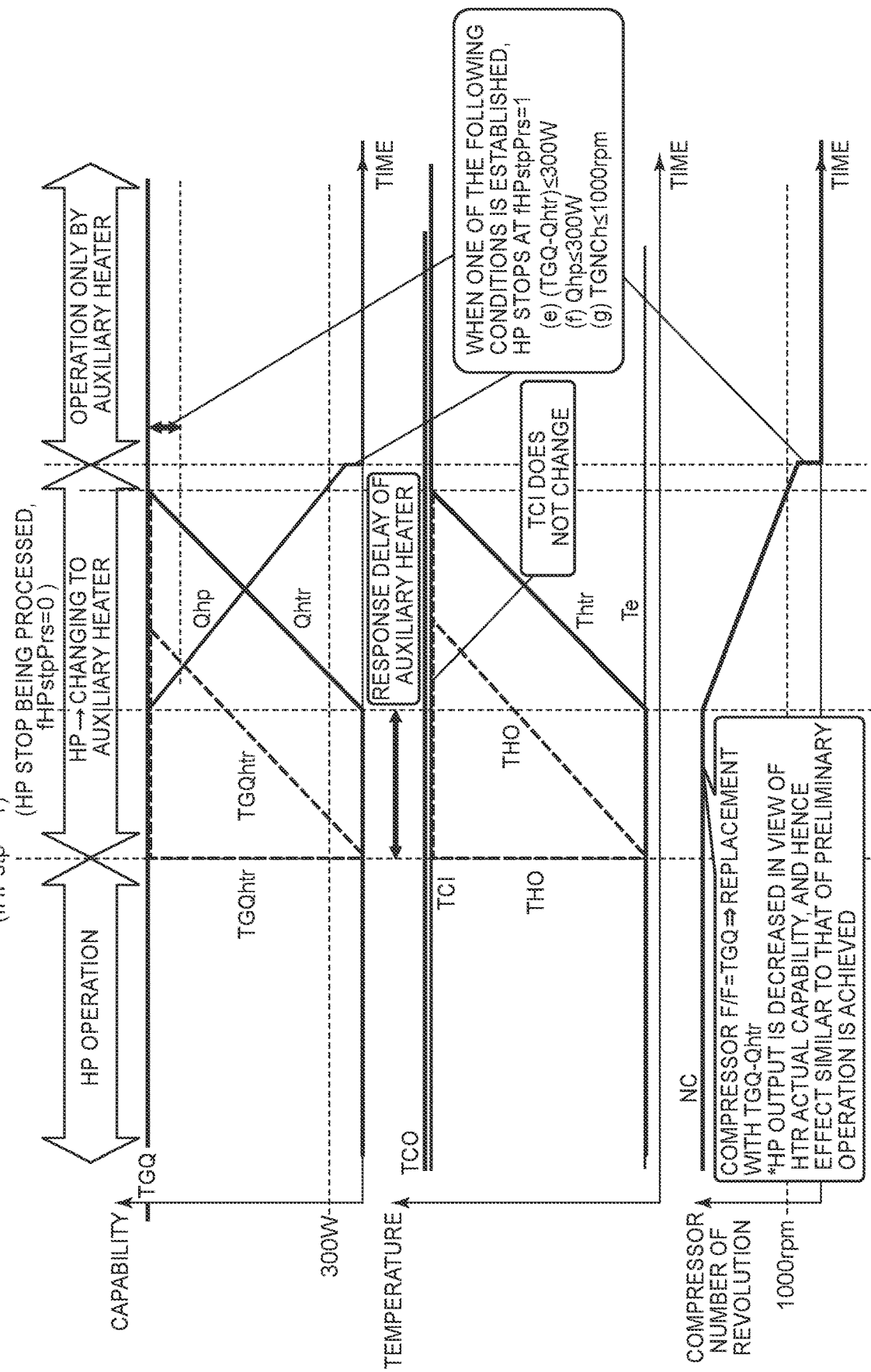
FIG. 8 is a timing chart to explain the shifting control in the heating mode by the controller of FIG. 2.

FIG. 8 shows a timing chart of the respective capabilities and temperatures and the number of revolution of the compressor 2 in this shifting control. In the drawing, an illustrated range of "HP operation" indicates a range of the above-mentioned cooperative control by the radiator 4 and the heating medium circulating circuit 23, but in the embodiment, the heating medium circulating circuit 23 is stopped (TGQhtr=0 and Qhtr=0). In this state, when the HP stop judgment flag fHPstp is set to "1" in the step S4 of FIG. 5, the shifting control is started. In the drawing, an illustrated range of "HP→changing to the auxiliary heater" is a range of the shifting control.

During this shifting control, the required capability TGQhtr of the heating medium circulating circuit 23 is adjusted to the required capability TGQ as described above (a vertically rising broken line in the drawing), and hence the HTR actual capability Qhtr also rises, but in actual, a heat capacity of the heating medium circulating circuit 23 is large. Therefore, after elapse of a delay time shown with "response delay of the auxiliary heater" in the drawing, the HTR actual capability Qhtr starts rising (this also applies to the auxiliary heater temperature Thtr).

At this time, the required capability TGQ input into the F/F control amount calculation section 58 of FIG. 4 is replaced with (TGQ−Qhtr), and hence the capability TGQ is maintained as it is in a period of time of this response delay, thereby obtaining an effect similar to an effect of a preliminary operation in which the heat capacity of the heating medium circulating circuit 23 is taken into consideration. Furthermore, the HP actual capability Qhp decreases in accordance with the increase of the HTR actual capability Qhtr after elapse of this period of time of the response delay. Consequently, as shown in FIG. 8, it is seen that the radiator temperature TCI detected by the radiator temperature sensor 46 does not change or hardly changes. At this time, in the embodiment, (TGQ−Qhtr) is input into the F/F control amount calculation section 58. In consequence, the controller sensitively responds to the increase of the heating capability of the heating medium circulating circuit 23, the number of revolution NC of the compressor 2 rapidly decreases, and hence fluctuation of the outlet temperature of the air blown out into the vehicle is effectively eliminated.

(6-6-2) HP Complete Stop Judgment

Figure 5:
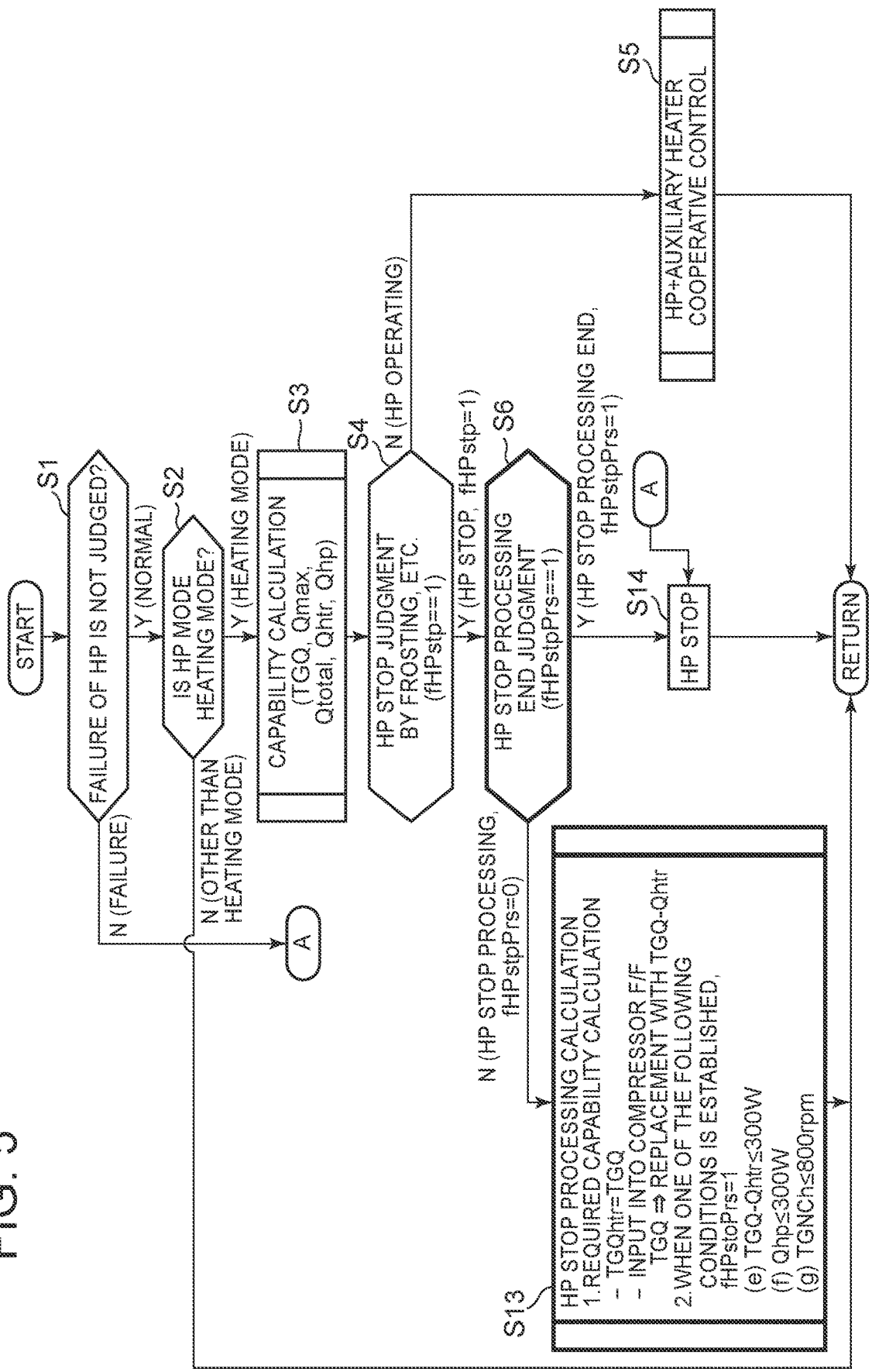
FIG. 5 is a flowchart to explain a heating mode by the controller of FIG. 2.

Furthermore, the controller 32 makes a judgment to completely stop the HP in the step S13 of FIG. 5. In this case, a condition for the HP complete stop judgment depends on whether or not one of the following conditions is established in the embodiment:

(e) the condition that the difference between the required capability TGQ that is the required heating capability of the radiator 4 and the HTR actual capability Qhtr that is the heating capability actually generated by the heating medium circulating circuit 23, i.e., (TGQ-Qhtr) ≤ predetermined value (a predetermined low value of, e.g., 300 W);

(f) the condition that the HP actual capability that is the heating capability actually generated by the radiator 4, i.e., Qhp ≤ predetermined value (a predetermined low value of, e.g., 300 W); and (g) the condition that the target number of revolution of the compressor 2, i.e., TGNCh ≤ predetermined value (a predetermined low value of, e.g., 800 rpm). When one of these conditions (e) to (g) is established, the controller 32 sets the HP stop flag fHPstpPrs to "1".

When this HP stop flag fHPstpPrs is set to "1", the controller 32 ends the shift processing and advances from the step S6 to the step S14 in FIG. 5 to stop the heat pump (the compressor 2). Consequently, afterward, the heating only by the heating medium circulating circuit 23 is performed. An illustrated range of "the operation only by the auxiliary heater" in FIG. 8 shows a range of the heating only by the heating medium circulating circuit 23. It is to be noted that a state where the HP stop flag fHPstpPrs is set to "1" is maintained until the HP stop judgment flag fHPstp is reset to "0" next in the step S4.

As described above, when shifting to the heating of the vehicle interior only by the heating medium circulating circuit 23 in the heating mode, the controller 32 executes the shifting control to increase the heating capability of the heating medium circulating circuit 23 prior to stopping the compressor 2 and decrease the heating capability of the radiator 4 in accordance with the increase of the heating capability of the heating medium circulating circuit 23. Consequently, when shifting to the heating only by the heating medium circulating circuit 23, it is possible to prevent or inhibit the disadvantage that the heating capability of the radiator 4 rapidly decreases and the temperature of the air to be blown out to the vehicle interior fluctuates to noticeably lower, before the heating capability of the heating medium circulating circuit 23 increases, and it is possible to improve comfortability of passengers.

In this case, the controller 32 in the shifting control adjusts the required capability TGQhtr of the heating medium circulating circuit 23 to the required capability TGQ that is the required heating capability of the radiator 4 in the heating mode. Consequently, it is possible to rapidly increase the heating capability of the heating medium circulating circuit 23.

Specifically, in the heating mode, the controller 32 calculates the target value of the high pressure (the target radiator pressure PCO) on the basis of the target outlet temperature TAO that is the target value of the temperature of the air to be blown out to the vehicle interior, and controls the number of revolution NC of the compressor 2 on the basis of the target value, the high pressure (the radiator pressure PCI) and the required capability TGQ, and in the shifting control, the controller subtracts, from the required capability TGQ, the HTR actual capability Qhtr that is the heating capability actually generated by the heating medium circulating circuit 23. Consequently, it is possible to achieve the decrease of the heating capability by the radiator 4 in accordance with the increase of the heating capability by the heating medium circulating circuit 23.

In this case, in the heating mode, the controller 32 calculates the F/F control amount TGNChff of the target number of revolution TGNCh of the compressor 2 by the feedforward calculation based on at least the required capability TGQ, calculates the F/B control amount TGNChfb of the target number of revolution TGNCh of the compressor 2 by the feedback calculation based on the target value (the target radiator pressure PCO) and the high pressure (the radiator pressure PCI), and adds the F/F control amount TGNChff and the F/B control amount TGNChfb to calculate the target number of revolution TGNCh of the compressor 2, and in the shifting control, the controller calculates the F/F control amount TGNChff on the basis of the value (TGQ−Qhtr) obtained by subtracting the HTR actual capability Qhtr from the required capability TGQ. Consequently, it is possible to sensitively respond to the increase of the heating capability of the heating medium circulating circuit 23, rapidly decrease the number of revolution NC of the compressor 2, and achieve more accurate and comfortable shifting control.

Furthermore, the controller 32 starts the above shifting control when there is established one of the condition that the frosting to the outdoor heat exchanger 7 proceeds, the condition that the operation efficiency of the compressor 2 deteriorates, and the condition that the heat absorption by the radiator 4 occurs. When any one of the conditions to start the shifting control is not established, the controller executes the cooperative control to complement the shortage of the heating capability of the radiator 4 with the heating by the heating medium circulating circuit 23. Consequently, it is possible to accurately achieve the switching between the cooperative heating by the radiator 4 and the heating medium circulating circuit 23 and the heating only by the heating medium circulating circuit 23.

In this case, the controller 32 in the shifting control stops the compressor 2 when there is established one of the condition that the difference (TGQ−Qhtr) between the required capability TGQ that is the required heating capability of the radiator 4 and the HTR actual capability Qhtr that is the heating capability actually generated by the heating medium circulating circuit 23 decreases to be not more than the predetermined value, the condition that the HP actual capability Qhp that is the heating capability actually generated by the radiator 4 decreases to be not more than the predetermined value, and the condition that the target number of revolution TGNCh of the compressor 2 decreases to be not more than a predetermined value. Consequently, it is possible to accurately shift to the heating only by the heating medium circulating circuit 23.

It is to be noted that in the embodiment of FIG. 1, the heating medium circulating circuit 23 constitutes the auxiliary heating device, but the present invention is not limited to this embodiment, and a PTC heater may constitute the auxiliary heating device. In this case, the PTC heater is disposed in the air flow passage 3 in place of the heating medium-air heat exchanger 40 of FIG. 1. This PTC (positive temperature coefficient) heater can exerts its performance more when the temperature of air flowing into the PTC heater is lower, due to its properties (a resistance value does not heighten), and hence it is efficient to dispose the heater on the air upstream side of the radiator 4 as in the embodiment.

Figure 9:
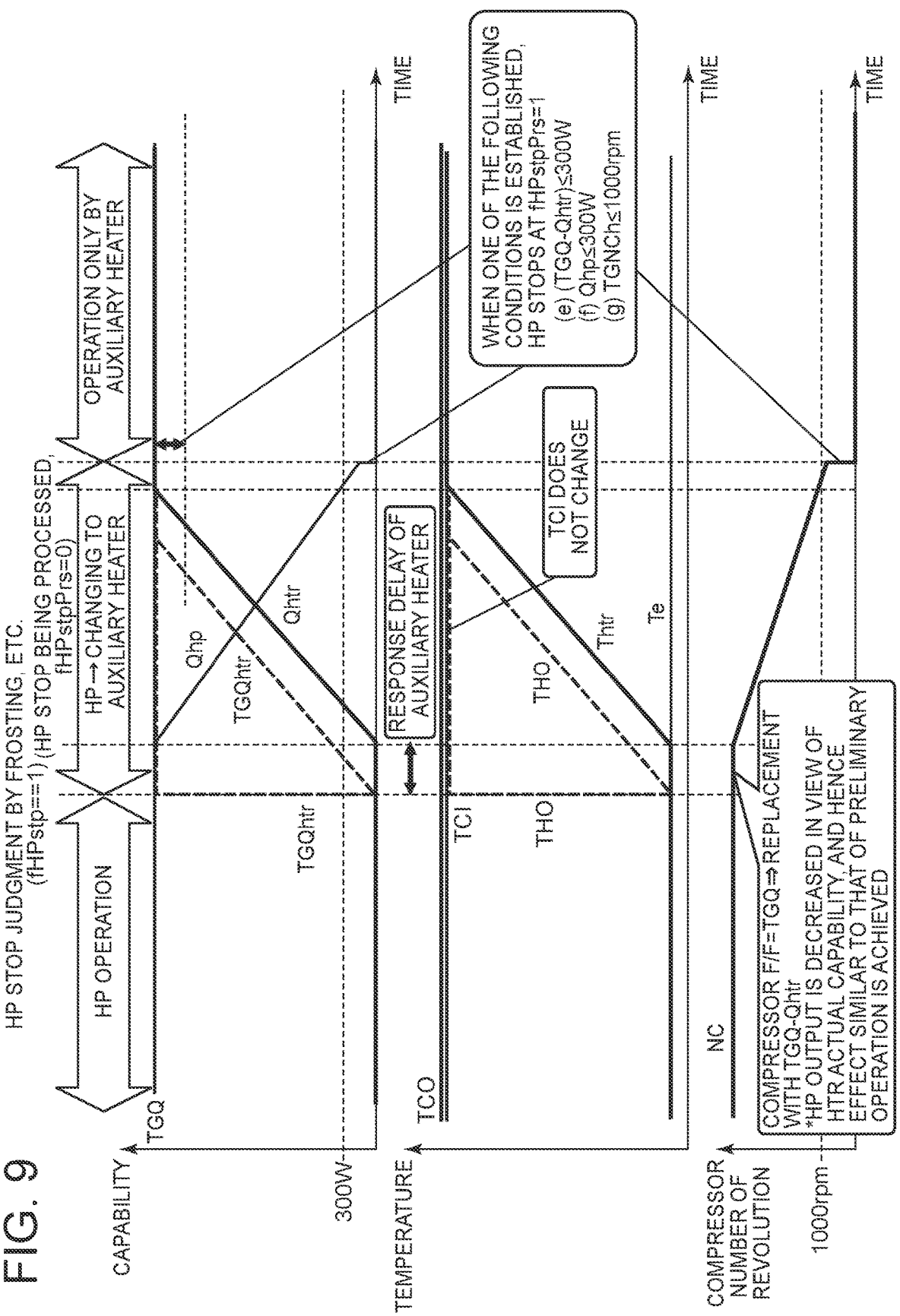
FIG. 9 is a timing chart to explain another example of the shifting control in the heating mode by the controller of FIG. 2.
Figure 10:
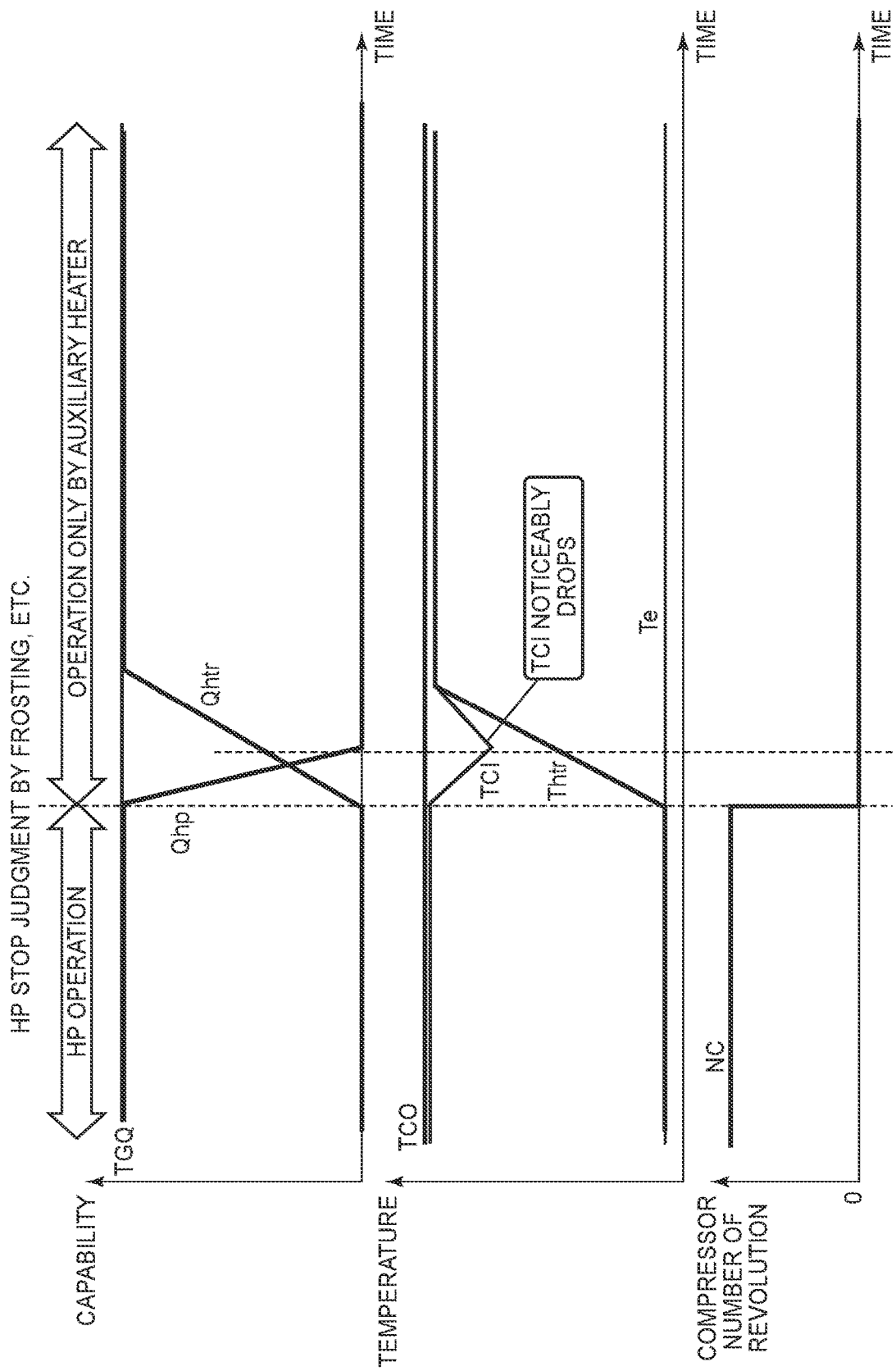
FIG. 10 is a timing chart to explain a conventional situation when heating by the radiator shifts to heating only by the auxiliary heating device.

FIG. 9 shows a timing chart of the respective capabilities and temperatures and the number of revolution of the compressor 2 in the shifting control when this PTC heater is disposed in the air flow passage 3. When the PTC heater is disposed in the air flow passage 3, a delay time shown with "the response delay of the auxiliary heater" is shorter than that in FIG. 8, because a heat capacity of the heater is smaller than that of the heating medium circulating circuit 23 of the above-mentioned embodiment. Others are similar to those of FIG. 8.

Furthermore, in the above-mentioned embodiment, simultaneously with the start of the shifting control, the required capability TGQhtr of the heating medium circulating circuit 23 (or the PTC heater) is adjusted to the required capability TGQ, but the present invention is not limited to this embodiment. As shown by an inclined broken line in FIG. 8 and FIG. 9, the required capability TGQhtr of the heating medium circulating circuit 23 (or the PTC heater) may gradually be increased to the required capability TGQ. Specifically, the capability is increased at a prescribed rising speed, or increased to TGQ with first-order lag.

When the required capability TGQhtr of the heating medium circulating circuit 23 (or the PTC heater) is gradually increased to the required capability TGQ, it is possible to inhibit rapid increase of the heating capability of the heating medium circulating circuit 23 (or the PTC heater), thereby further effectively inhibiting rapid fluctuation of the temperature of the air blown out to the vehicle interior.

Additionally, in an auxiliary heating device such as the heating medium circulating circuit 23 having the large heat capacity, there may be provided a preliminary operation period of time to start increase of the heating capability of the auxiliary heating device before the controller 32 starts the decrease of the heating capability of the radiator 4 in accordance with the heat capacity of the auxiliary heating device in the shifting control. Consequently, also when the calculation of the F/F control amount TGNChff on the basis of (TGQ−Qhtr) as in the embodiment is not performed, it is possible to deal with response delay of the auxiliary heating device having the large heat capacity without any hindrance.

In addition, according to the above-mentioned embodiment, the required capability TGQ to be input into the F/F control amount calculation section 58 of FIG. 4 is replaced with (TGQ−Qhtr) in the shifting control, but does not have to be replaced in the invention other than the invention of claim 4 and claim 5. Specifically, when the input is not replaced, the controller increases the heating capability of the heating medium circulating circuit 23 prior to stopping the compressor 2. Consequently, in accordance with the increase of the heating capability of the heating medium circulating circuit 23, the feedback calculation by the F/B control amount calculation section 60 of FIG. 4 acts to decrease the number of revolution NC of the compressor 2, thereby decreasing the heating capability of the radiator 4.

However, in the feedback calculation, the number of revolution NC of the compressor 2 is decreased after the heating by the heating medium circulating circuit 23 exerts an influence, and hence, as a result, the outlet temperature might temporarily rise. To eliminate the problem, when (TGQ−Qhtr) is input into the F/F control amount calculation section 58 as in the embodiment, it is possible to sensitively respond to the increase of the heating capability of the heating medium circulating circuit 23. Consequently, the number of revolution NC of the compressor 2 rapidly decreases, and hence the fluctuation of the outlet temperature of the air blown out to the vehicle interior (the temporary rise) can effectively be eliminated.

Furthermore, in the embodiment, the present invention is applied to the vehicle air conditioning device 1 which switches among and executes the respective operation modes of the heating mode, the dehumidifying and heating mode, the internal cycle mode, the dehumidifying and cooling mode and the cooling mode, but the present invention is not limited to this embodiment, and the present invention is also effective to a vehicle air conditioning device which operates only in the heating mode.

Additionally, the constitution of the refrigerant circuit R and respective numeric values described above in each embodiment do not restrict the present invention, and are changeable without departing from the gist of the present invention.

DESCRIPTION OF REFERENCE NUMERALS 1 vehicle air conditioning device
2 compressor
3 air flow passage
4 radiator
6 outdoor expansion valve
7 outdoor heat exchanger
8 indoor expansion valve
9 heat absorber
17, 20, 21 and 22 solenoid valve
23 heating medium circulating circuit (an auxiliary heating device)
26 suction changing damper
27 indoor blower (a blower fan)
28 air mix damper
30 circulating pump
32 controller (a control device)
35 heating medium heating electric heater (an electric heater)
40 heating medium-air heat exchanger (an auxiliary heating device)
R refrigerant circuit

The invention claimed is:

1. A vehicle air conditioning device comprising:
a compressor to compress a refrigerant,
an air flow passage through which air to be supplied to a vehicle interior flows,
a radiator to let the refrigerant radiate heat, thereby heating the air to be supplied from the air flow passage to the vehicle interior,
an outdoor heat exchanger disposed outside the vehicle interior to let the refrigerant absorb heat, and
a control device,
the control device being configured to execute a heating mode to let the refrigerant discharged from the compressor radiate heat in the radiator, decompress the refrigerant from which the heat has been radiated, and let the refrigerant absorb heat in the outdoor heat exchanger, thereby heating the vehicle interior,
the vehicle air conditioning device further comprising an auxiliary heating device to heat the air to be supplied from the air flow passage to the vehicle interior, and the control device is configured to be able to heat the vehicle interior only by the auxiliary heating device in the heating mode, wherein in the heating mode, the control device is configured to calculate a required capability TGQ that is a required heating capability of the radiator, wherein when shifting to the heating of the vehicle interior only by the auxiliary heating device in the heating mode, the control device is configured to execute a shifting control to increase a heating capability of the auxiliary heating device prior to stopping the compressor and decrease a heating capability of the radiator in accordance with the increase of the heating capability of the auxiliary heating device, and in the shifting control, the control device is configured to increase the required capability TGQhtr of the auxiliary heating device gradually up to the required capability TGQ, and adjust the required capability TGQhtr of the auxiliary heating device to the required capability TGQ.

2. The vehicle air conditioning device according to claim 1, wherein in the shifting control, the control device is configured to start increase of the heating capability of the auxiliary heating device prior to starting decrease of the heating capability of the radiator in accordance with a heat capacity of the auxiliary heating device.

3. The vehicle air conditioning device according to claim 1, wherein the control device is configured to start the shifting control when there is established one of a condition that frosting to the outdoor heat exchanger proceeds, a condition that an operation efficiency of the compressor decreases, and a condition that heat absorption by the radiator occurs.

4. The vehicle air conditioning device according to claim 3, wherein in the shifting control, the control device is configured to stop the compressor when there is established one of a condition that a difference (TGQ-Qhtr) between the required capability TGQ that is the required heating capability of the radiator and the HTR actual capability Qhtr that is the heating capability actually generated by the auxiliary heating device decreases to be not more than a predetermined value, a condition that an HP actual capability Qhp that is a heating capability actually generated by the radiator decreases to be not more than a predetermined value, and a condition that the target number of revolution TGNCh of the compressor decreases to be not more than a predetermined value.

5. The vehicle air conditioning device according to claim 3, wherein in the heating mode, when any one of the conditions to start the shifting control is not established, the control device is configured to execute cooperative control to complement shortage of the heating capability of the radiator with the heating by the auxiliary heating device.

6. The vehicle air conditioning device according to claim 1, wherein the control device is configured to increase the required capability TGQhtr of the auxiliary heating device at a prescribed rising speed, or increase the required capability TGQhtr of the auxiliary heating device with first-order lag.

7. A vehicle air conditioning device comprising:
a compressor to compress a refrigerant,
an air flow passage through which air to be supplied to a vehicle interior flows,
a radiator to let the refrigerant radiate heat, thereby heating the air to be supplied from the air flow passage to the vehicle interior,
an outdoor heat exchanger disposed outside the vehicle interior to let the refrigerant absorb heat, and
a control device,
the control device being configured to execute a heating mode to let the refrigerant discharged from the compressor radiate heat in the radiator, decompress the refrigerant from which the heat has been radiated, and let the refrigerant absorb heat in the outdoor heat exchanger, thereby heating the vehicle interior,
the vehicle air conditioning device further comprising an auxiliary heating device to heat the air to be supplied from the air flow passage to the vehicle interior, and the control device is configured to be able to heat the vehicle interior only by the auxiliary heating device in the heating mode,
wherein in the heating mode, the control device is configured to calculate a required capability TGQ that is a required heating capability of the radiator,
wherein in the heating mode, the control device is configured to calculate a target value of a high pressure on the basis of a target outlet temperature that is a target value of a temperature of air to be blown out to the vehicle interior, and controls a number of revolution of the compressor on the basis of the target value of a high pressure, the high pressure and the required capability TGQ,
wherein when shifting to the heating of the vehicle interior only by the auxiliary heating device in the heating mode, the control device is configured to execute a shifting control to increase a heating capability of the auxiliary heating device prior to stopping the compressor and decrease a heating capability of the radiator in accordance with the increase of the heating capability of the auxiliary heating device, and
in the shifting control, the control device is configured to adjust the required capability TGQhtr of the auxiliary heating device to the required capability TGQ, and subtract, from the required capability TGQ, an HTR actual capability Qhtr that is a heating capability actually generated by the auxiliary heating device.

8. The vehicle air conditioning device according to claim 7, wherein in the heating mode, the control device is configured to calculate a F/F control amount TGNChff of a target number of revolution of the compressor by feedforward calculation based on at least a required capability TGQ, calculates a F/B control amount TGNChfb of the target number of revolution of the compressor by feedback calculation based on the target value of a high pressure and the high pressure, and adds the F/F control amount TGNChff and the F/B control amount TGNChfb to calculate a target number of revolution TGNCh of the compressor, and
in the shifting control, the control device is configured to calculate the F/F control amount TGNChff on the basis of a value (TGQ-Qhtr) obtained by subtracting the HTR actual capability Qhtr from the required capability TGQ.

* * * * *